United States Patent [19]
Erickson

[11] Patent Number: 6,085,442
[45] Date of Patent: Jul. 11, 2000

[54] FOOD DEHYDRATOR

[75] Inventor: Chad S. Erickson, Plymouth, Minn.

[73] Assignee: The Metal Ware Corporation, Two Rivers, Wis.

[21] Appl. No.: 09/263,416

[22] Filed: Mar. 5, 1999

Related U.S. Application Data

[63] Continuation-in-part of application No. 08/781,719, Jan. 10, 1997, Pat. No. 5,878,508.

[51] Int. Cl.$^7$ ........................................................ G26B 7/00
[52] U.S. Cl. .................................. 34/381; 34/417; 34/488; 34/197; 34/211
[58] Field of Search .............................. 34/380, 381, 413, 34/417, 443, 488, 196, 197, 211, 238; 99/467, 483; 219/385, 386, 387, 400; D7/327, 350

[56] References Cited

U.S. PATENT DOCUMENTS

| | | |
|---|---|---|
| D. 252,397 | 7/1979 | Cousins et al. . |
| D. 261,142 | 10/1981 | Erickson et al. . |
| D. 401,468 | 11/1998 | Knoll et al. . |
| 4,190,965 | 3/1980 | Erickson . |
| 4,192,081 | 3/1980 | Erickson et al. . |
| 4,224,743 | 9/1980 | Erickson et al. . |
| 4,237,623 | 12/1980 | Timm et al. . |
| 4,531,306 | 7/1985 | Erickson . |
| 4,536,643 | 8/1985 | Erickson . |
| 4,619,053 | 10/1986 | Schumacher . |
| 4,750,276 | 6/1988 | Smith et al. . |
| 4,779,604 | 10/1988 | Konig . |
| 4,780,596 | 10/1988 | Matsushima et al. . |
| 5,215,004 | 6/1993 | Su . |
| 5,235,906 | 8/1993 | Hsu . |
| 5,261,168 | 11/1993 | Li . |
| 5,311,673 | 5/1994 | Su . |
| 5,379,527 | 1/1995 | Su . |
| 5,420,393 | 5/1995 | Dornbush et al. . |
| 5,423,249 | 6/1995 | Meyer . |
| 5,437,108 | 8/1995 | Alseth . |
| 5,438,916 | 8/1995 | Dornbush et al. . |
| 5,454,298 | 10/1995 | Lu . |
| 5,458,050 | 10/1995 | Su . |
| 5,878,508 | 9/1999 | Knoll et al. . |

FOREIGN PATENT DOCUMENTS

WO95/19112  7/1995  WIPO .

OTHER PUBLICATIONS

"We've got the deals and the advice on the best appliances," RetraVision, Adveriisement, pp. 24, Jan. 1995.

"Healthy Food Dryer," Sunbeam Corporation Limited, Instruction Booklet and Guarantee, 19 pgs., (1994).

Primary Examiner—Stephen Gravini
Attorney, Agent, or Firm—Godfrey & Kahn, S.C.

[57] ABSTRACT

A modular food dehydrator utilizing a heater blower assembly located on a top surface of a dehydrator module is disclosed. The heater blower assembly includes a motor driven fan, a heating element and an air distribution portion for directing heated air across the support surfaces. The heater blower assembly is preferably releasably attachable to the dehydrator module. In a first embodiment, the dehydrator module has a central opening extending generally vertically through the support surfaces in fluid communication with the heater blower assembly for directing heated air radially outward across the plurality of support surfaces. The dehydrator module preferably includes outlet vents on an outer perimeter surface for exhausting the heated air. At least one outlet vent is preferably located between each of the plurality of support surfaces. In a second embodiment, the dehydrator module includes air ducts on an outer perimeter surface in fluid communication with the heater blower assembly for directing pressurized, heated air radially inward across the plurality of support surfaces. The dehydrator module includes a central opening extending generally vertically through the support surfaces in fluid communication with a space between each the support surfaces for exhausting or recirculating heated air. In a third embodiment, the heater blower assembly is housed within the cover to provide a more compact unit.

26 Claims, 26 Drawing Sheets

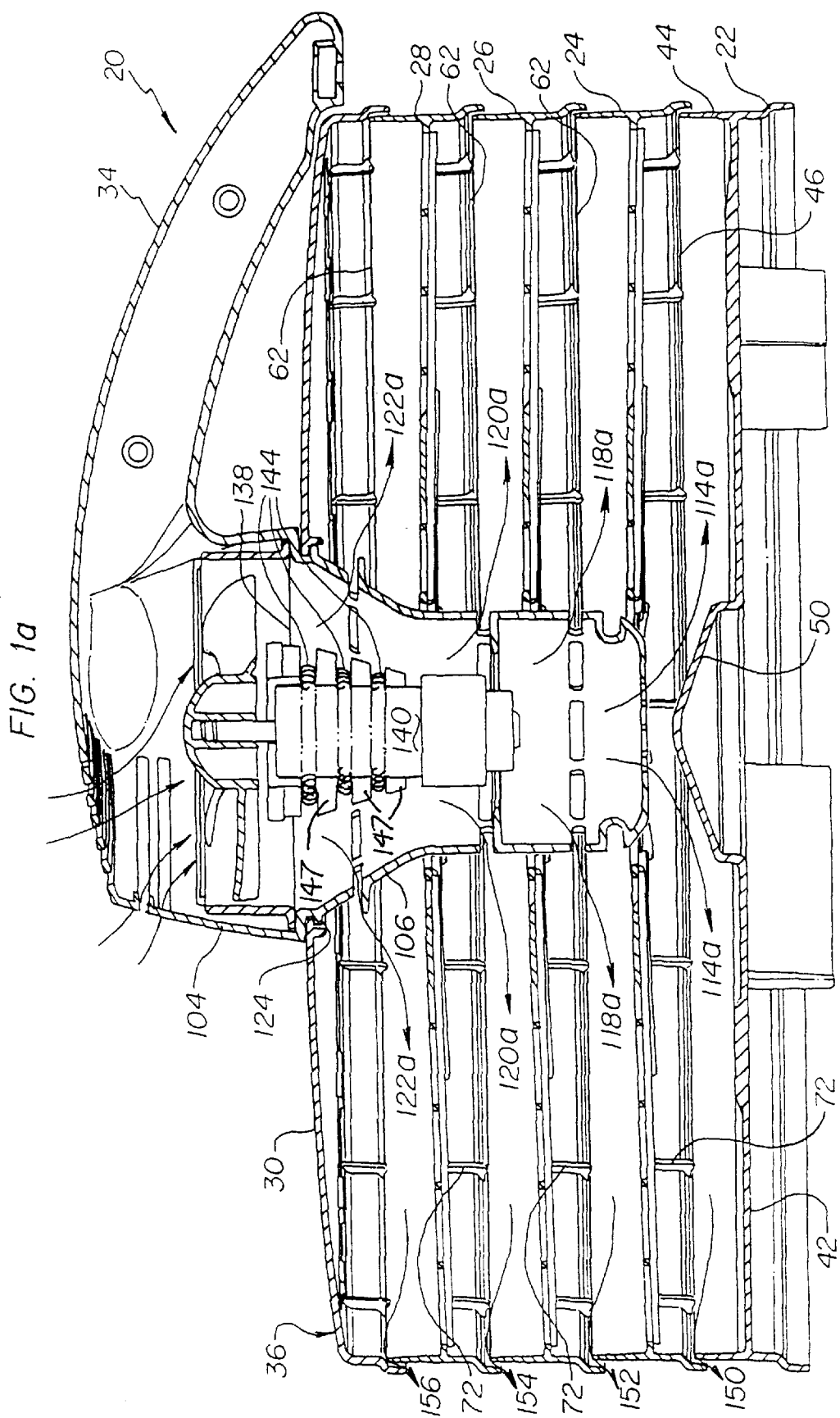

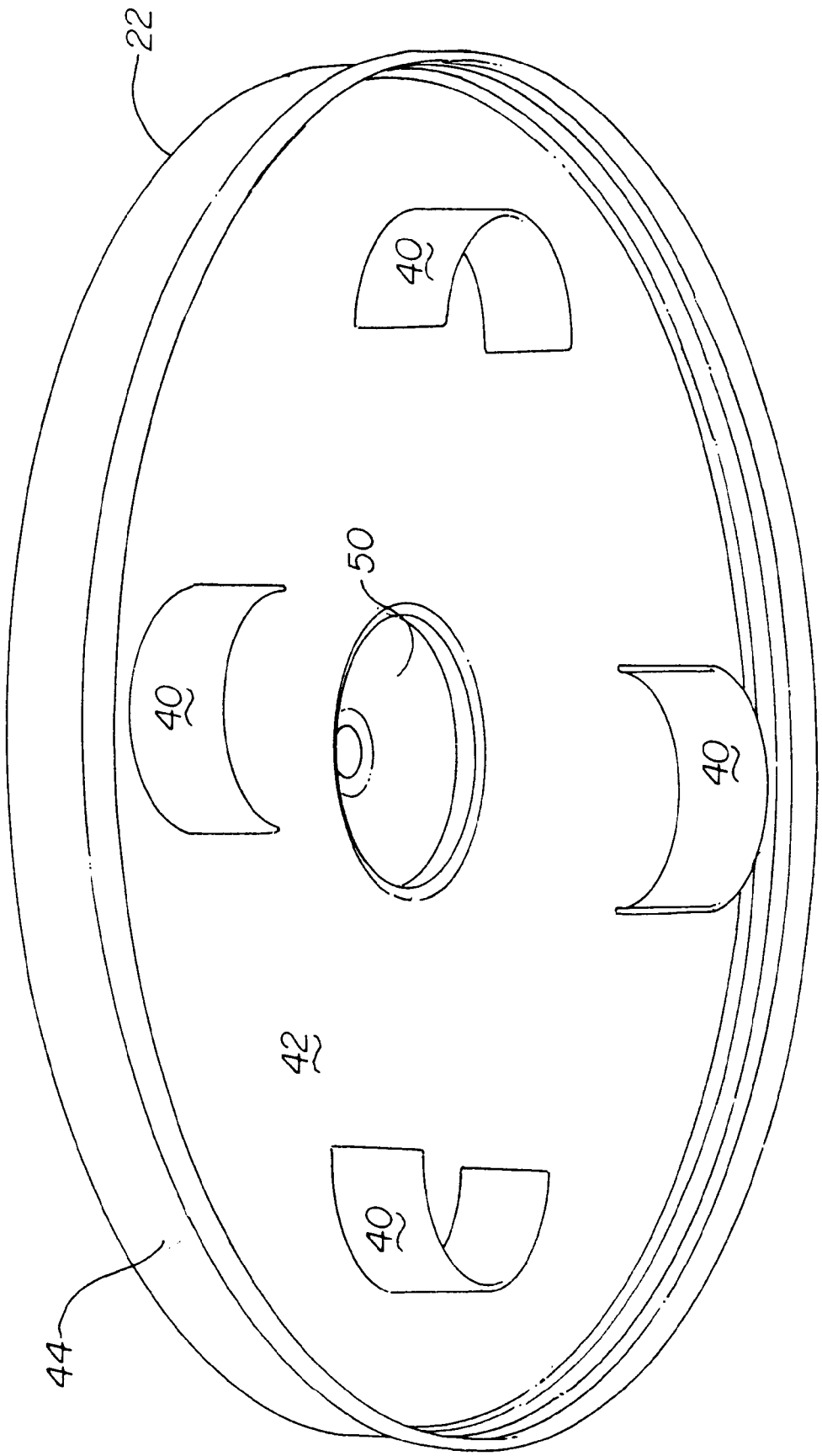

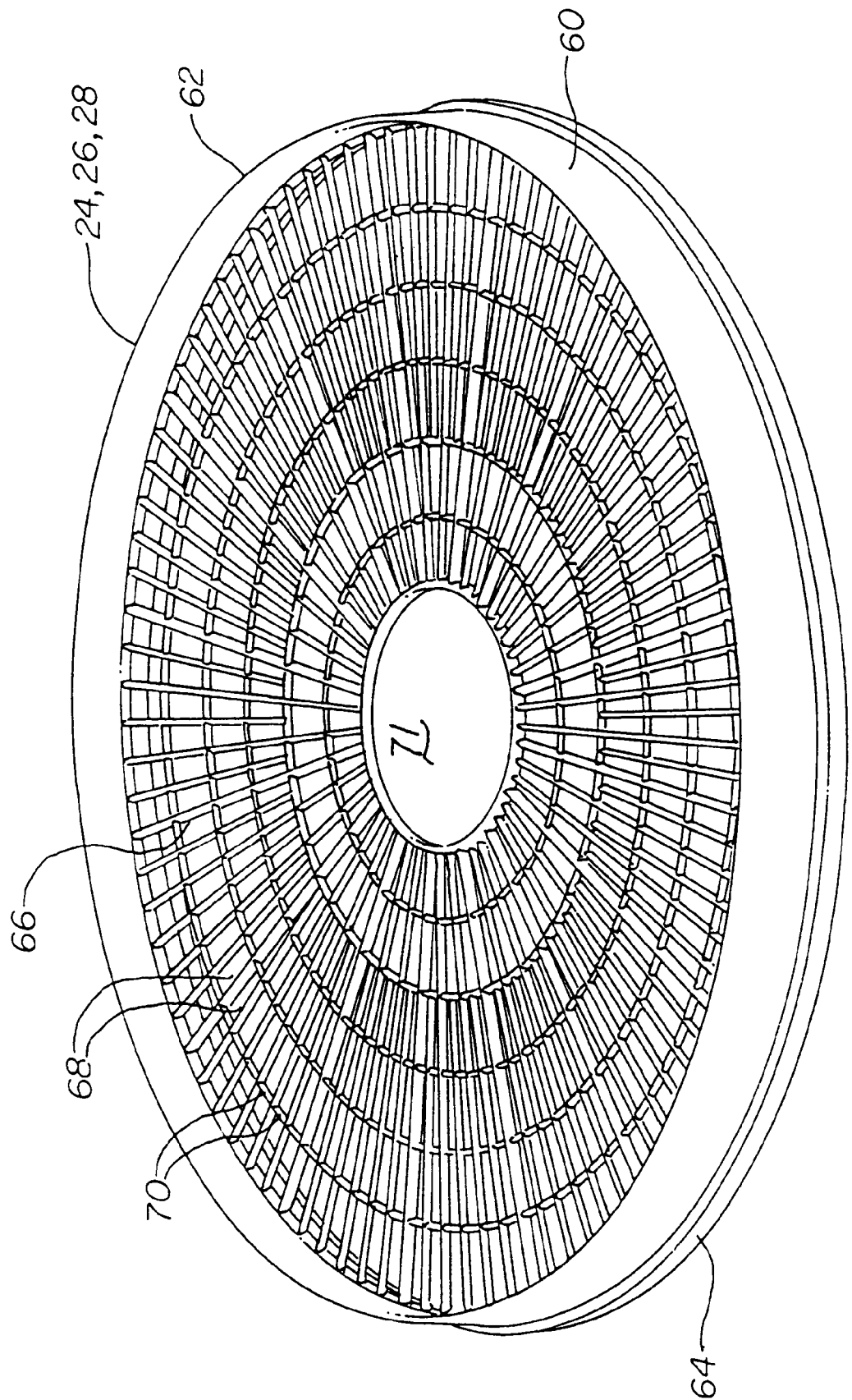

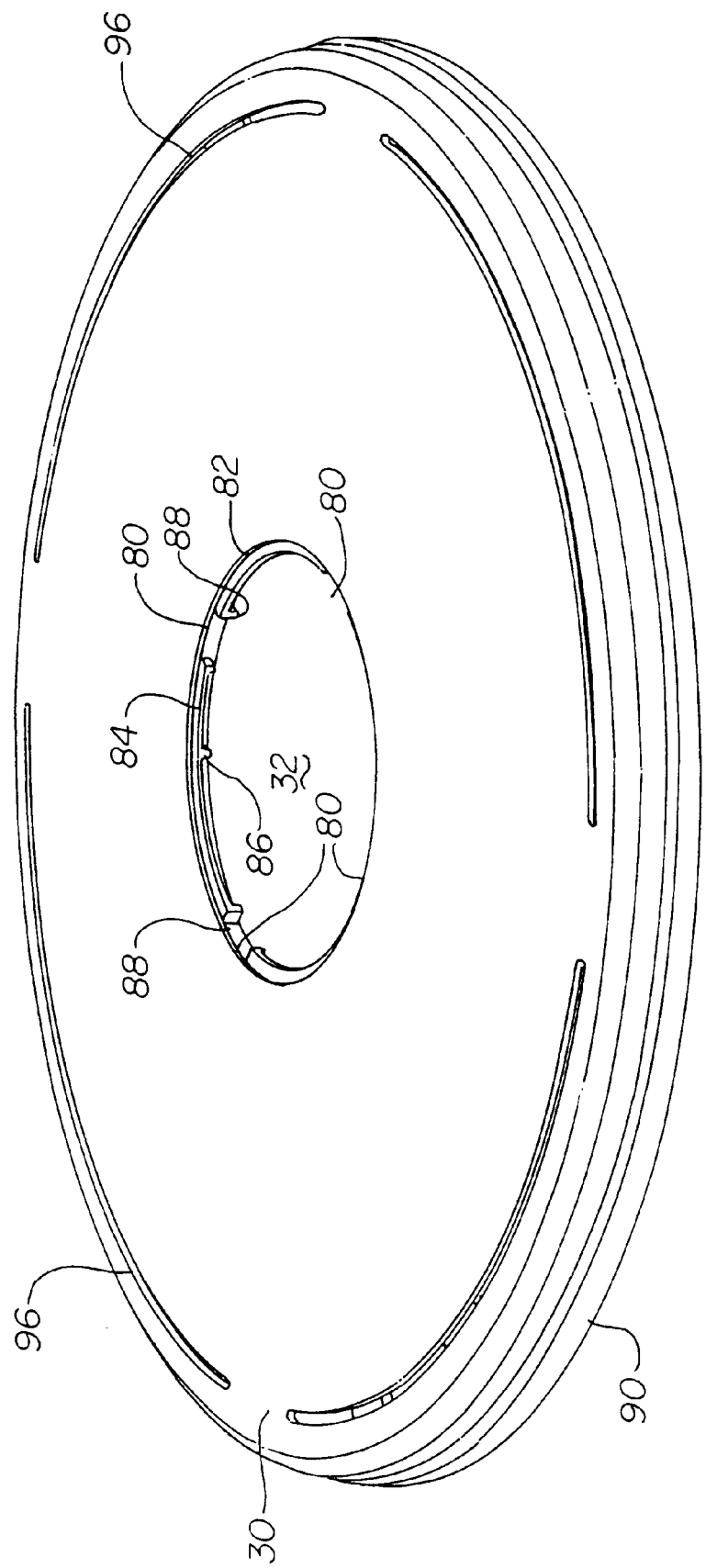

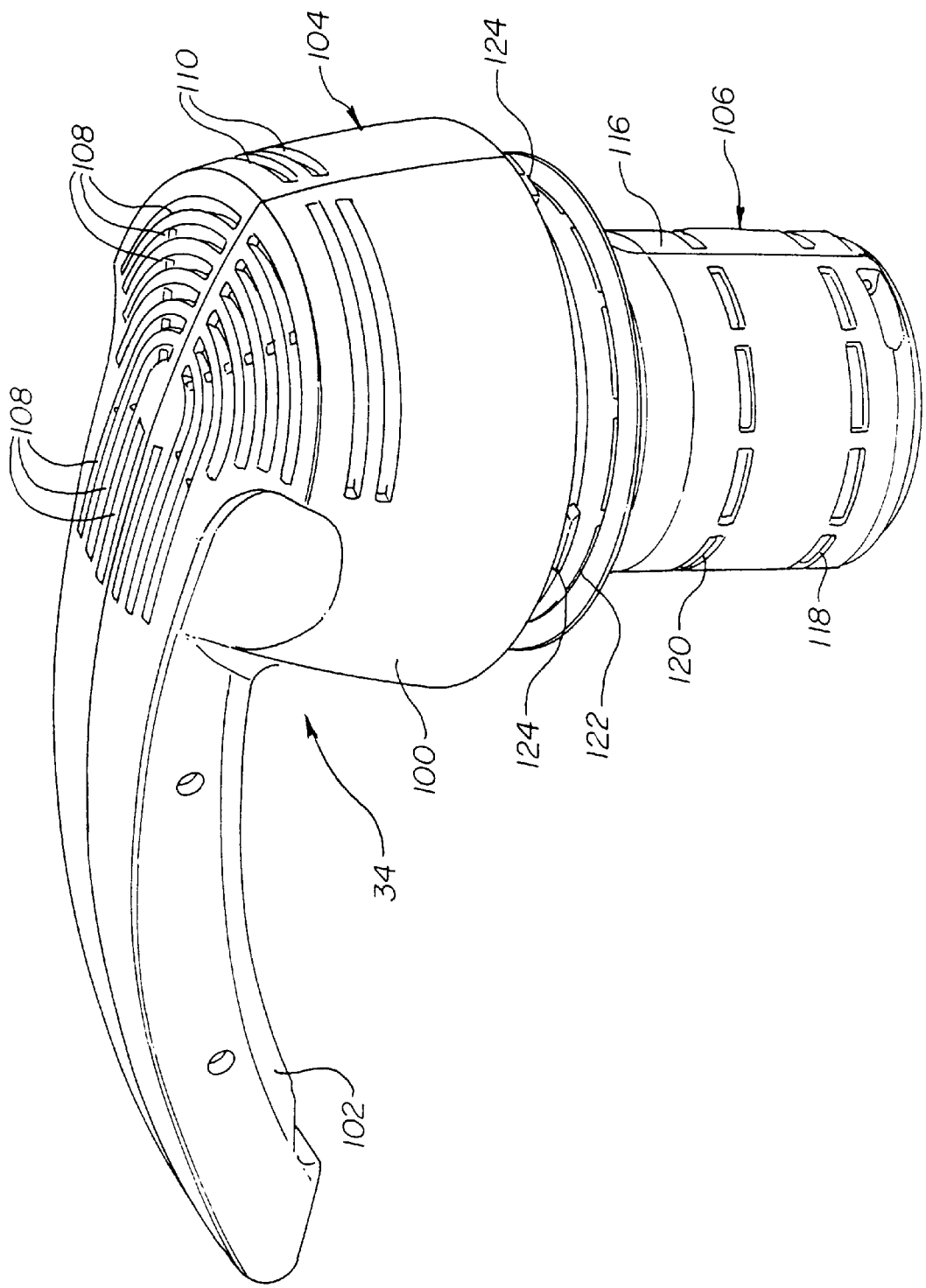

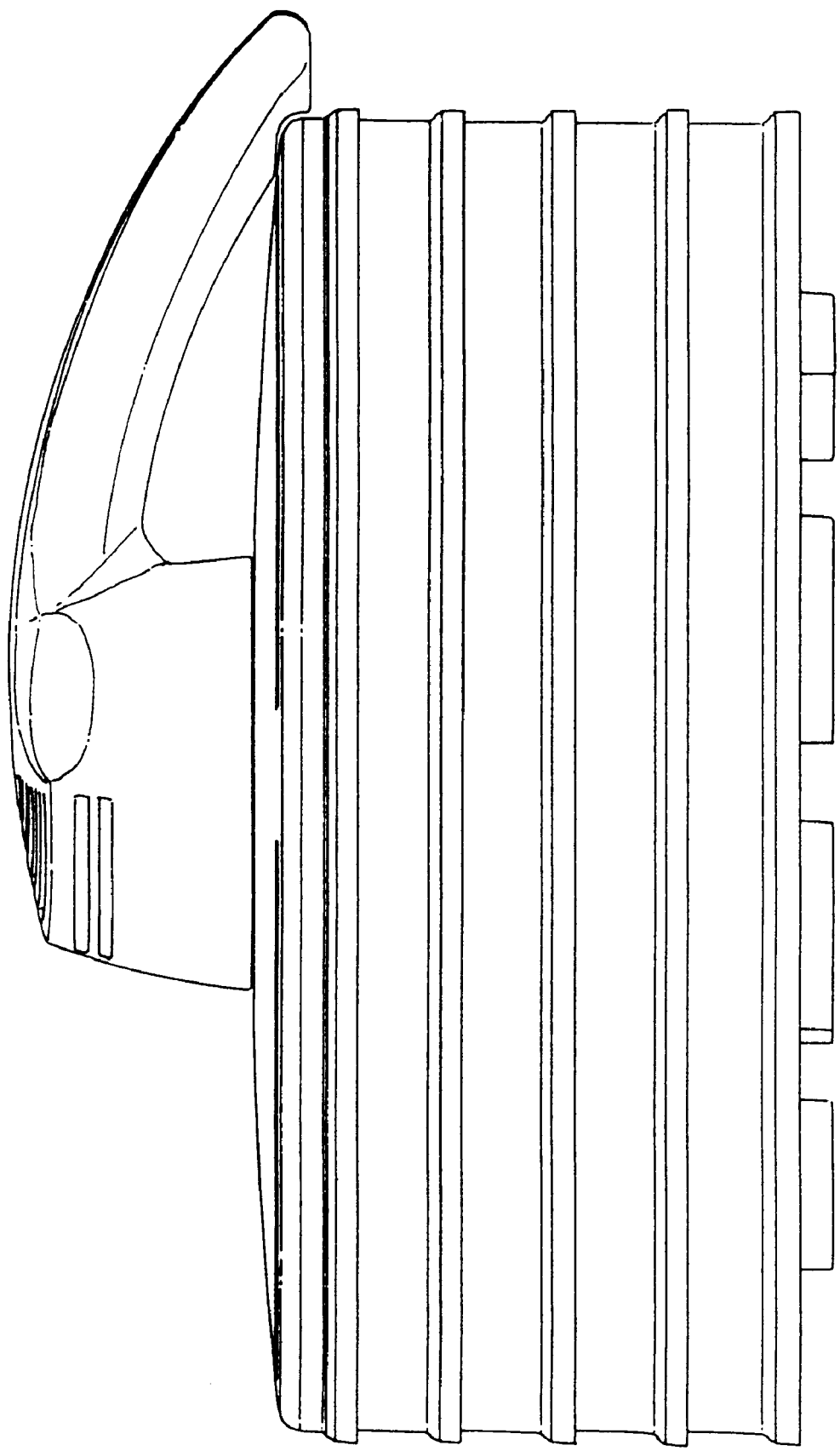

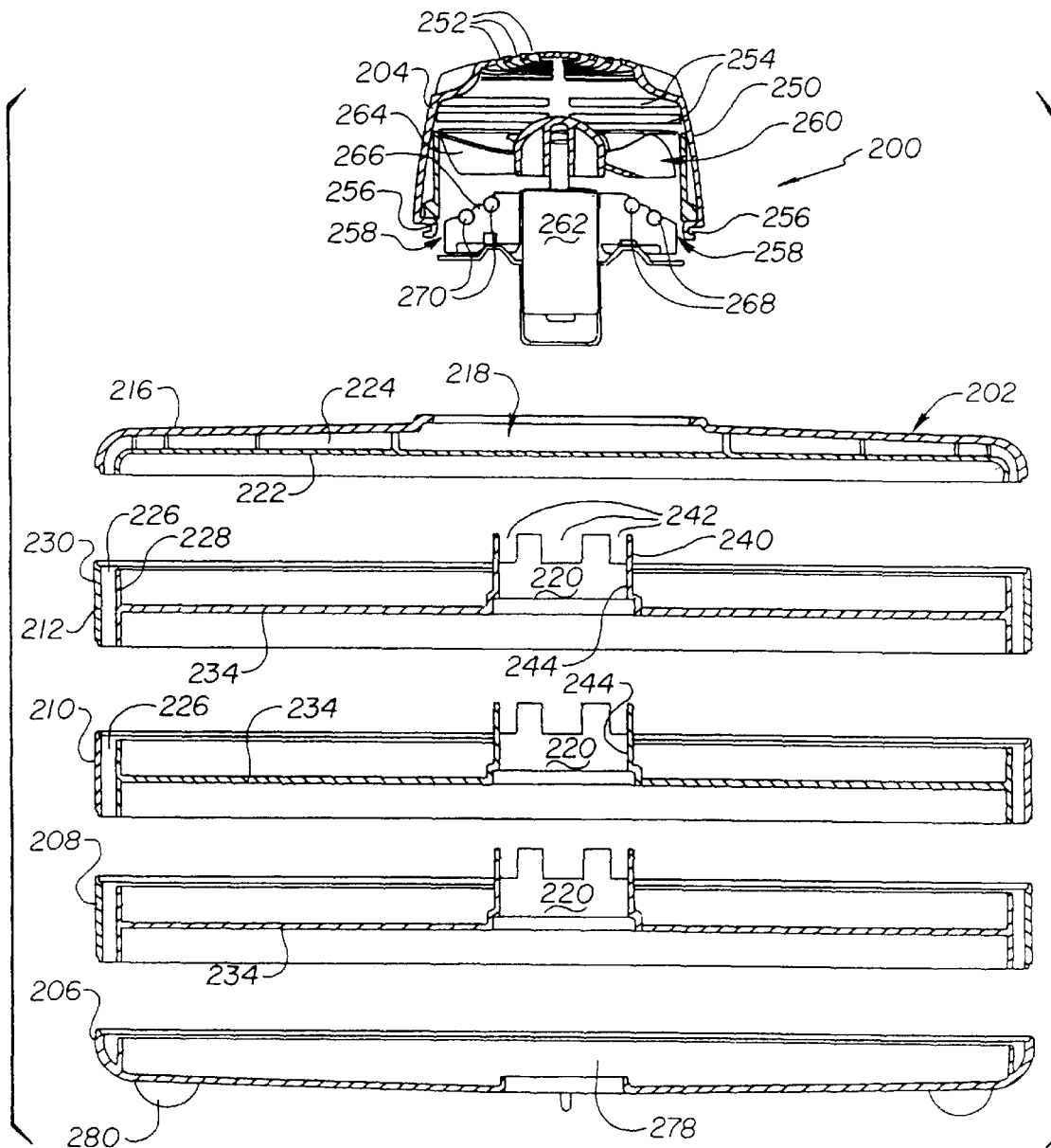

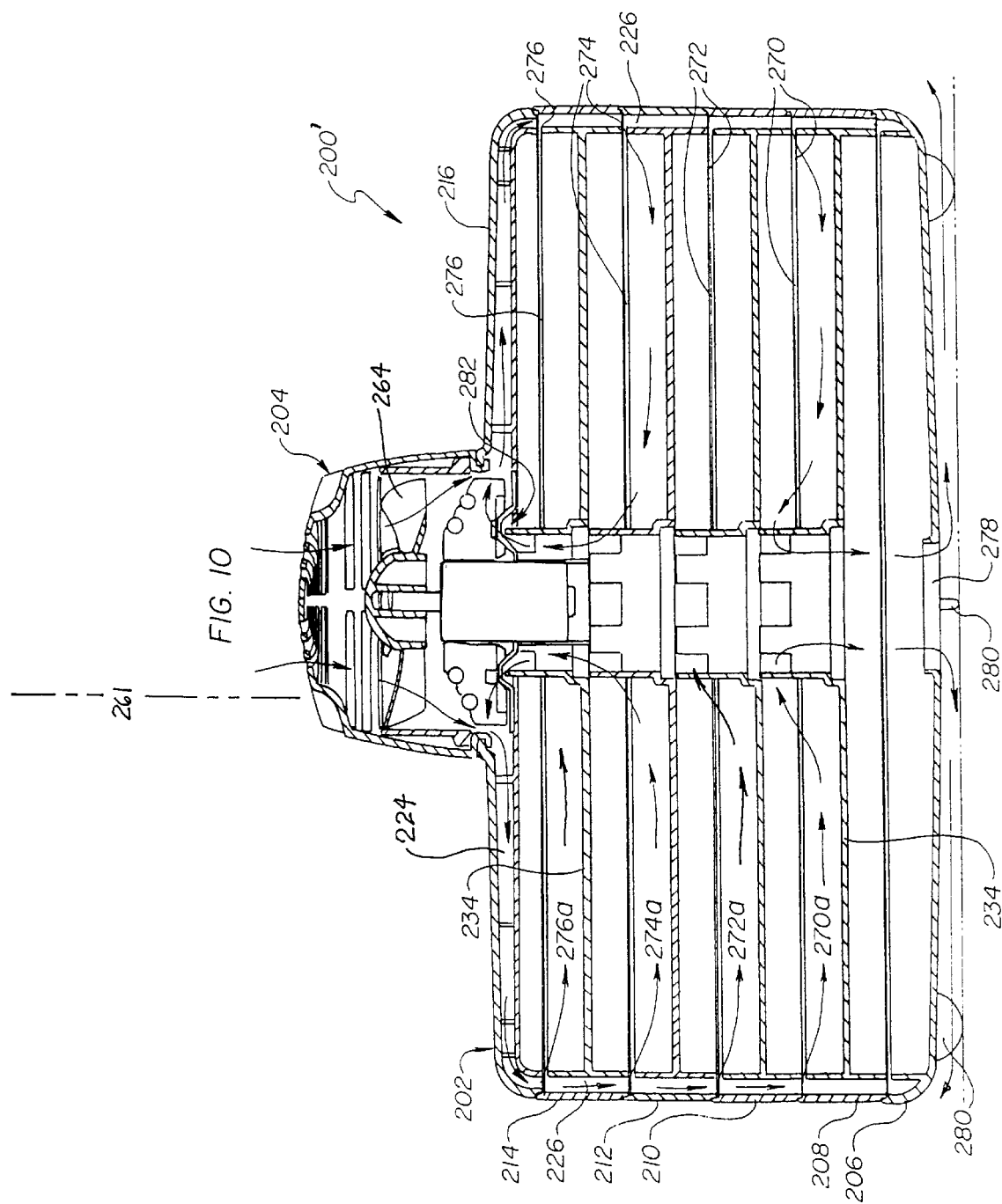

FOOD DEHYDRATOR

CROSS-REFERENCE TO RELATED APPLICATIONS

This application is a continuation-in-part of U.S. patent application Ser. No. 08/781,719, filed Jan. 10, 1997, now U.S. Pat. No. 5,878,508.

FIELD OF THE INVENTION

The present invention relates to a modular food dehydrator with a top mounted heater blower assembly.

BACKGROUND OF THE INVENTION

The preservation of food by dehydration is well known in the art. The early dehydration of food was typically carried out by placing the food product in an open container exposed to the air and to the sun. In more recent times, mechanical food dehydrators have been developed for use in the home. These food dehydrators typically include a plurality of shelves contained within a cabinet after which the food to be dried is placed. The dehydrator typically uses a motor driven fan to draw air through openings and circulate the air throughout the dehydrator. A heater is typically provided for heating the air before it is circulated by the fan, such as disclosed in U.S. Pat. No. 5,458,050 (Su).

A significant number of current food dehydrators locate the heater element and blower fan in the base. The heated air moves vertically through a series of perforated trays. The air is warmest and driest at the first tray, and becomes progressively cooler and more humid as it reaches the later trays. Therefore, the food on the trays closest to the hot air source get very dry, while that furthest from the source dries more slowly. Directing the heated air vertically through a series of trays results in uneven drying.

Locating the heating element and blower motor in the base also creates cleaning problems. These bases are typically not dishwasher safe. Additionally, the base can become contaminated with drippings that fall through the perforations in the trays. If meat products are dried, the grease drippings may create a fire hazard.

Many food dehydrators require the heated air to travel through various ducts before reaching the food. The ducts typically have multiple bends that result in velocity loss and heat dissipation before the heated air reaches the food. Consequently, more powerful heating elements and blower fans are typically used to compensate for the convoluted air flow paths through the dehydrator. Finally, most current dehydrators are large and bulky creating difficulties with use and storage in the home.

SUMMARY OF THE INVENTION

The present invention relates to a modular food dehydrator utilizing a heater blower assembly located on a top surface of a dehydrator module. The heater blower assembly includes a motor driven fan, a heating element and an air distribution portion for directing heated air across the support surfaces. The heater blower assembly is preferably releasably attachable to the dehydrator module.

In a first embodiment, the dehydrator module has a central opening extending generally vertically through the support surfaces in fluid communication with the heater blower assembly for directing pressurized, heated air radially outward across the plurality of support surfaces. The dehydrator module preferably includes outlet vents on an outer perimeter surface for exhausting the heated air. At least one outlet vent is preferably located between each of the plurality of support surfaces.

In a second embodiment, the dehydrator module includes air ducts on an outer perimeter surface in fluid communication with the heater blower assembly for directing heated air radially inward across the plurality of support surfaces. The dehydrator module includes a central opening extending generally vertically through the support surfaces in fluid communication with a space between each the support surfaces for exhausting heated air. A portion of the heated air may be recirculated.

The first embodiment of the food dehydrator includes a heater blower assembly comprising a motor driven fan and heating elements located in a housing. The housing has air inlet vents on a central portion through which outside air can be drawn toward the heating element. The housing also includes blower ports located on an air distribution portion through which pressurized, heated air can be directed. The dehydrator module includes a base, at least one food tray and a cover. The food tray has a support surface with a central opening for receiving the air distribution portion. The food tray capable of stacking vertically with the base so that an outlet vent is formed between the base and the food tray when in a stacked configuration. The cover is capable of stacking vertically with the food tray. The cover also has a central opening for receiving the air distribution portion. The air distribution portion extends downward through the central openings in the cover and the food tray in an engaged configuration so that the blower ports are positioned to direct heated air axially outward across the support surface of the food tray. At least a portion of the heated air is exhausted to the atmosphere through the outlet vent.

The heater blower assembly may be detachable or permanently attached to the dehydrator module. Various mechanisms are available for releasably securing the heater blower assembly to the dehydrator module. The air distribution portion preferably includes first blower ports for directing heated air axially outward across a floor of the base and across a bottom surface of the support surface and second blower ports for directing heated air axially outward across a top surface of the support surface. A flow diverter may optionally be located below the first blower ports. The support surface is preferably an open mesh structure so that heated air will contact the top and bottom of the food items. Alternatively, the support structure may be solid for drying liquids or semi-liquid food items.

Outlet vents may be located on the cover or in a gap formed between the cover and the top food tray. The cover may include a side wall having a flared bottom edge. Spaced supports may optionally be located along an inside perimeter of the flared bottom edge. The spaced supports are capable of forming a gap between a top edge of the food tray and the flared bottom edge when in a stacked configuration. The food trays include a corresponding flared bottom edge with the spaced supports. The spaced supports are capable of forming a gap between a top edge of an adjacent food tray and the flared bottom edge when in a stacked configuration. Consequently, a plurality of food trays may be stacked, forming outlet vents therebetween. The components of the dehydrator module are preferably dishwasher safe and immersible in water.

The present invention is also directed to a kit for assembling a food dehydrator having at least two food trays.

The present invention is also directed to a method of operating a food dehydrator. The method includes vertically stacking at least one food tray and a cover onto a base so that an outlet vent is formed between the base and the food tray and adjacent food trays. The air distribution portion of the heater blower assembly is inserted downward through a central openings in the cover and a support surface(s) of the food tray. Outside air is draw in through the air inlet vents to the heating element and pressurized, heated air is directed through the blower ports axially outward across the support surface of the food tray. At least a portion of the heated air is vented to the atmosphere through the outlet vent.

In the first embodiment, locating the heater blower module close to the center food trays provides for the shortest path to the food and minimizes loss in air velocity and heat. Heat generated by the motor is also retained within the dehydrator module. There is only one right angle bend in the air flow before the heated air reaches the food, minimizing velocity losses. Substantially all of the heated air comes directly from the dehydrator module, rather than from neighboring trays, minimizing differences in air temperature and humidity from tray to tray.

In the second embodiment, recirculating a portion of the heated air conserves energy, since the air is already heated, although the air also has a higher moisture content. Supplying the heated air from the outer perimeter of the food trays insures that the warmest and driest air encounters the larger surface area of the support surfaces at the perimeter of the food trays. The air cools and absorbs moisture as it moves radially inward. However, the velocity of the heated air increases as it moves radially inward, compensating in large part, for the increase moisture content and lower temperature of the air.

In a third embodiment, the heater blower assembly is housed within the cover and does not extend vertically into the support surfaces. The food dehydrator is similar to the second embodiment in that the dehydrator module has a plurality of support surfaces having an opening extending generally vertically therethrough, and includes air ducts on an outer perimeter surface in fluid communication with the heater blower assembly. The top mountable cover has air inlet vents and an air duct on an outer perimeter surface in fluid communication with the heater blower assembly and the air ducts of the dehydrator module. The base of the dehydrator module includes an outlet vent for exhausting the heated air. In a stacked arrangement, the cover and the food trays form a plurality of blower ports around the outer perimeter of the support surfaces to direct heated air radially inward and generally horizontally across the support surfaces. In operation, air is drawn in through the air inlet vents, through the fan and to the heating element, and pressurized, heated air is directed radially inward and generally horizontally across the support surfaces.

A kit for assembling the third embodiment of the food dehydrator includes a base having an outlet vent; at least one food tray having a support surface with a central opening, and capable of stacking vertically with the base; a cover capable of stacking vertically with the food tray, and having an air inlet vent; and a heater blower assembly including a motor driven fan and heating element removably mountable in the cover. In an engaged arrangement, the cover and the food tray(s) form a blower port around the perimeter of the support surface to direct heated air flow radially inward and generally horizontally across the support surface of the food tray.

In the operation of the third embodiment of the food dehydrator, at least one food tray is vertically stacked onto a base, and the cover with the attached heater blower assembly is vertically stacked on the food tray. In a stacked arrangement, the air duct of the cover is in fluid communication with the heater blower assembly and the air ducts of the food tray. Air is drawn in through the air inlet vent of the cover to the heating element; and the heated air is directed outward into the air duct of the cover, into the air ducts of the food tray, and radially and generally horizontally across the support surface of the food tray. At least a portion of the air is vented to the atmosphere through the outlet vent, and a portion of the air is drawn vertically upward through the central opening of the food trays into the blower by the negative pressure created by operation of the blower. The air is then passed over the heating element and recirculated through the system.

With regard to both the first, second and third embodiments of the food dehydrators, the total path length the air travels from the heater coils to the food trays, until it is exhausted through the outlet vents, is preferably about the same from tray to tray contributing to uniform heating. Moving the heated air flow horizontally over the food, rather than vertically through the trays, also provides for more uniform drying of food items from tray to tray. The horizontal air flow also permits drying of liquid or semi-liquid materials on a solid or a non-porous support surfaces with no blockage of air movement. The symmetrical nature of the dehydrator modules also contributes to even distribution of heated air and more even drying of the food. A detachable nature of the detachable heater blower assemblies allows for easy storage of the food dehydrators. It is anticipated that the relatively compact, detachable heater blower assemblies will be stored along with other kitchen appliances, while the more robust and bulkier trays can be stored in another area without concern over dirt and moisture. Once the detachable heater blower assemblies are removed from the dehydrator modules all remaining components are dishwasher safe and can be fully immersed in water.

Advantageously, the compactness of the heater blower assembly of the third embodiment of the food dehydrator allows it to be completely housed within the cover, without extending down into the center of the food trays. The heater blower assembly is composed of a compact, brushless DC type motor housed within the hub of a centrifugal (radial) type fan, which provides a low profile assembly. This arrangement relocates the motor out of the stream of warm air returning from the food trays, and provides cooling of the motor by the air flow from the blower, making it easier to maintain the motor at an acceptable temperature during operation. In addition, the use of a centrifugal fan, which intakes air vertically and expels it horizontally into the perimeter air ducts of the dehydrator, makes a separate air deflector unnecessary. In operation, the centrifugal fan also creates a negative pressure that naturally draws air upward from the food trays for recirculation through the system. The use of a brushless DC type motor decreases the noise level during operation and increases the life span of the product.

Another advantage of the third embodiment of the food dehydrator is the structure and location of the heater assembly. The use of multiple fasteners to mount the heating wire coil onto flat, rectangular insulation plates reduces breakage of the wire during assembly and operation of the dehydrator, and eliminates the need for fiberglass yarn reinforcement of the wire coil. The positioning of the heater assembly parallel to the flow of air from the blower significantly decreases air noise and air flow resistance. The location of the heater in the path of the recirculating air being drawn upward by the fan, helps maintain an even air temperature throughout the system.

Yet another advantage of the third food dehydrator is the positioning of a thermostat to allow the temperature of the combined, heated incoming and recirculating air to be easily monitored and accurately controlled. The inclusion of a temperature adjustment knob at the top of the dehydrator unit also allows the user to readily adjust the temperature of the circulated air.

BRIEF DESCRIPTION OF THE SEVERAL VIEWS OF THE DRAWINGS

FIG. 1a is a sectional side view of the present food dehydrator with the heater blower assembly in the engaged configuration.

FIG. 2a is a bottom prospective view of the base for the present food dehydrator.

FIG. 2b is a top prospective view of the base of FIG. 2a.

FIG. 3a is a top prospective view of an exemplary food tray for the present food dehydrator.

FIG. 3b is a bottom prospective view of the food tray of FIG. 3a.

FIG. 4a is a top prospective view of a cover for the present food dehydrator.

FIG. 4b is a bottom prospective view of the cover of FIG. 4a.

FIG. 5 is a prospective view of a heater blower assembly for the present food dehydrator.

FIG. 8b is a side view of the food dehydrator of FIG. 7.

FIG. 9 is an exploded side sectional view of an alternate food dehydrator.

FIG. 10 is a side sectional view of the food dehydrator of FIG. 9 with an additional food tray.

FIG. 16b is an end view of the thermostat of FIG. 16a.

FIG. 17b is a sectional side view of the blower and motor housing of FIG. 17a.

FIG. 17c is a bottom view of the blower and motor housing of FIG. 17a.

DETAILED DESCRIPTION OF THE INVENTION

Figure 1B:
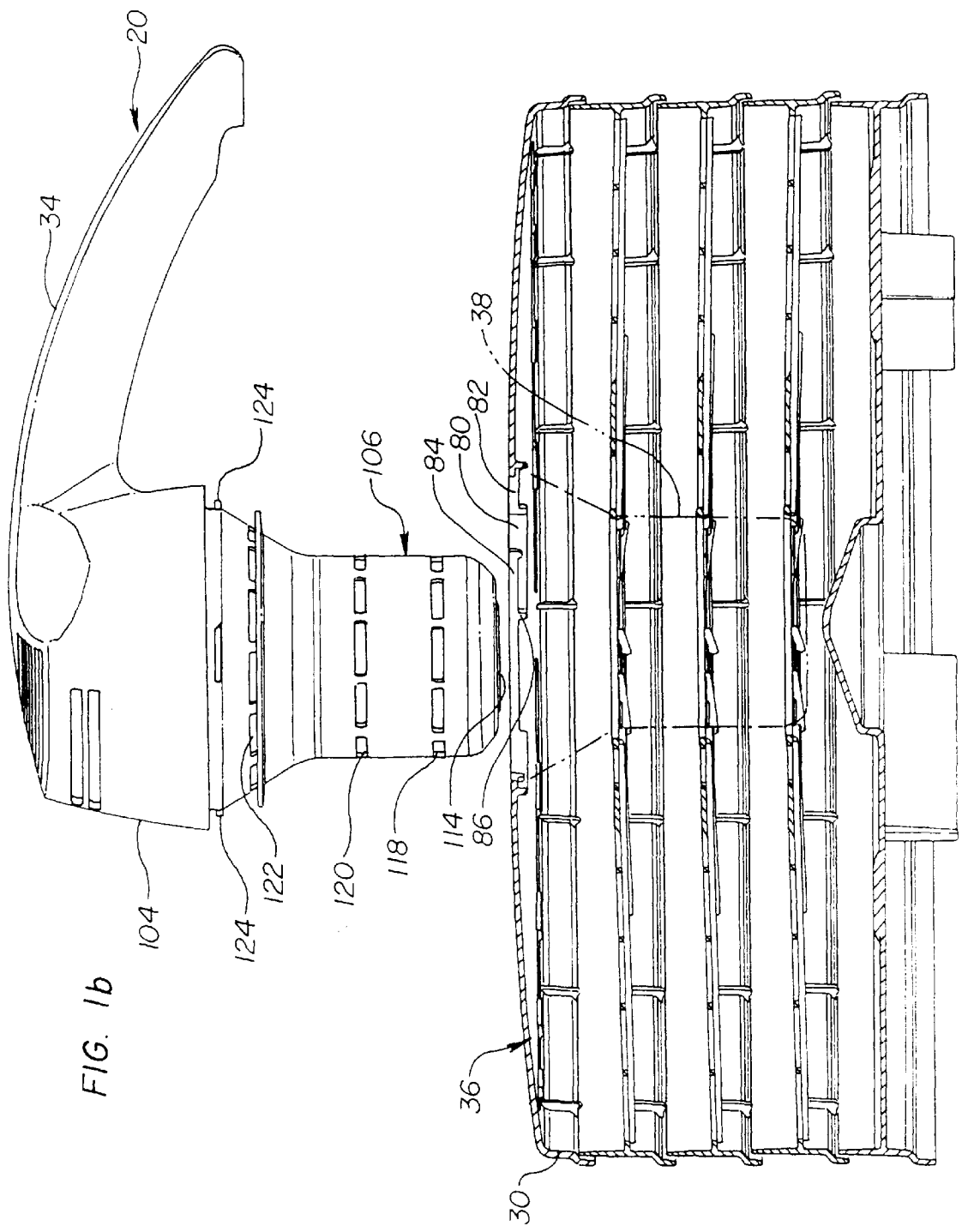
FIG. 1b is a sectional side view of the present food dehydrator with the heater blower assembly in the disengaged configuration.

FIGS. 1a and 1b are side sectional views of the preferred food dehydrator 20 of the present invention. The food dehydrator 20 includes a dehydrator module 36 and a detachable heater blower assembly 34. The dehydrator module 36 includes a base 22 on which may be stacked a series of food trays 24, 26, and 28. A cover 30 extends across the top of the food tray 28. The detachable heater blower assembly 34 extends downward through a central opening 32 in the cover 30 (see FIG. 4a) and central openings 71 in the food trays 24–28 into a central cavity 38 (see dashed lines in FIG. 1b). In an alternate embodiment, the heater blower assembly 34 is permanently attached to the dehydrator module 36. The base 22 and food trays 24–28 may be molded from a suitable thermoplastic material, such as acrylonitrile butadiene styrene (ABS), styrene-acrylonitrile resin (SAN), or styrene.

Figure 2B:
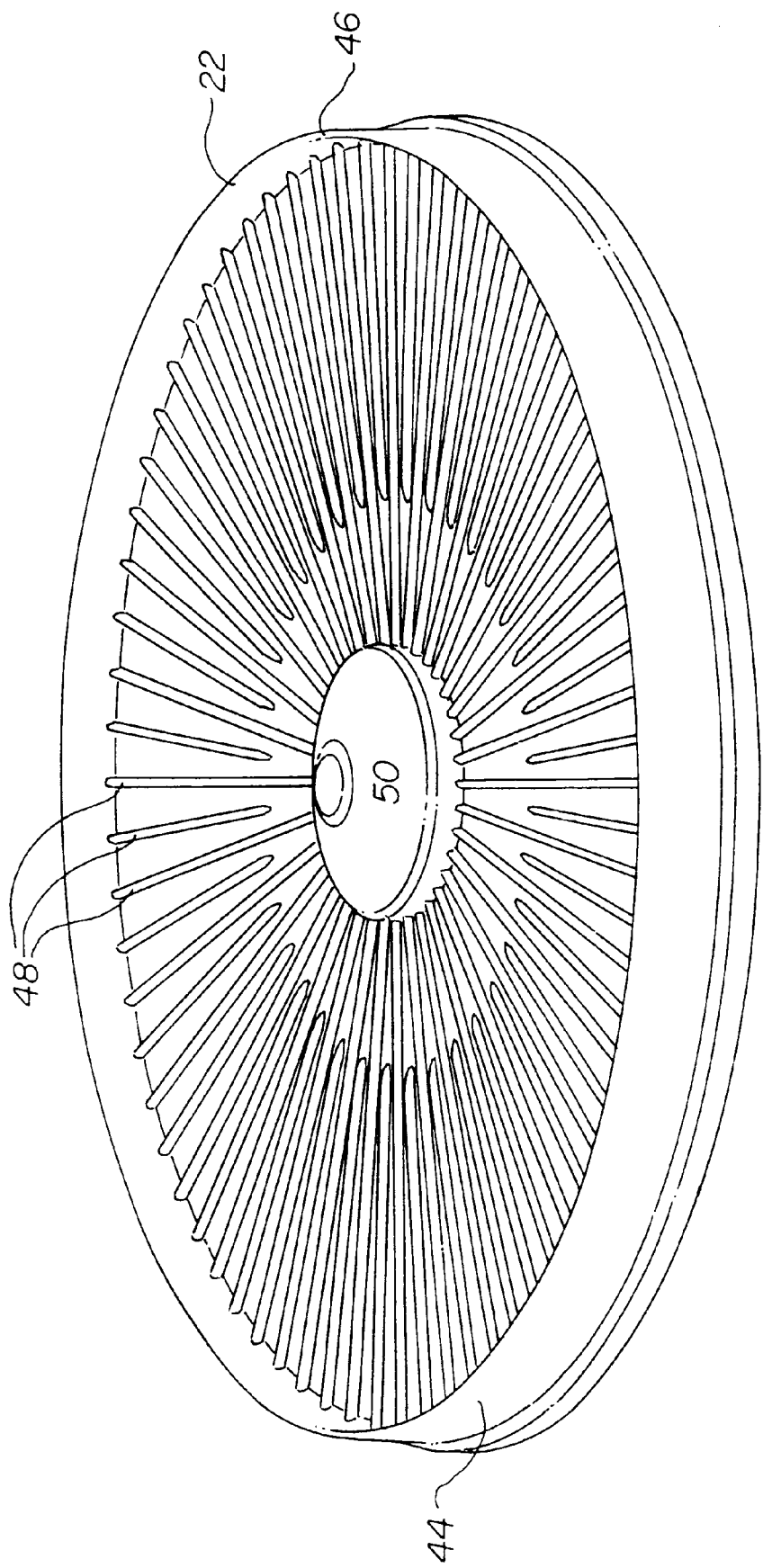

FIGS. 2a and 2b are bottom and top prospective views of the base 22, respectively. The bottom of the base 22 includes a series of legs 40 attached to a lower surface of a floor 42. Sidewall 44 extends around the perimeter of the floor 42. The sidewall 44 includes a top edge 46 that engages with a flared bottom edge 64 of the food tray 24 (see FIGS. 3A and 3B). A top surface of the floor 42 includes a series of radial support members 48 so that heated air can flow freely below food to be dehydrated. The radial support members 48 also allows drippings from the food items to be collected on the floor 42 of the base 22 without contaminating food items located thereon. Consequently, the base 22 can serve as an additional food tray. A flow diverter 50 is located in the center of the floor 42 for directing the heated air horizontally across the base 22.

Figure 3B:
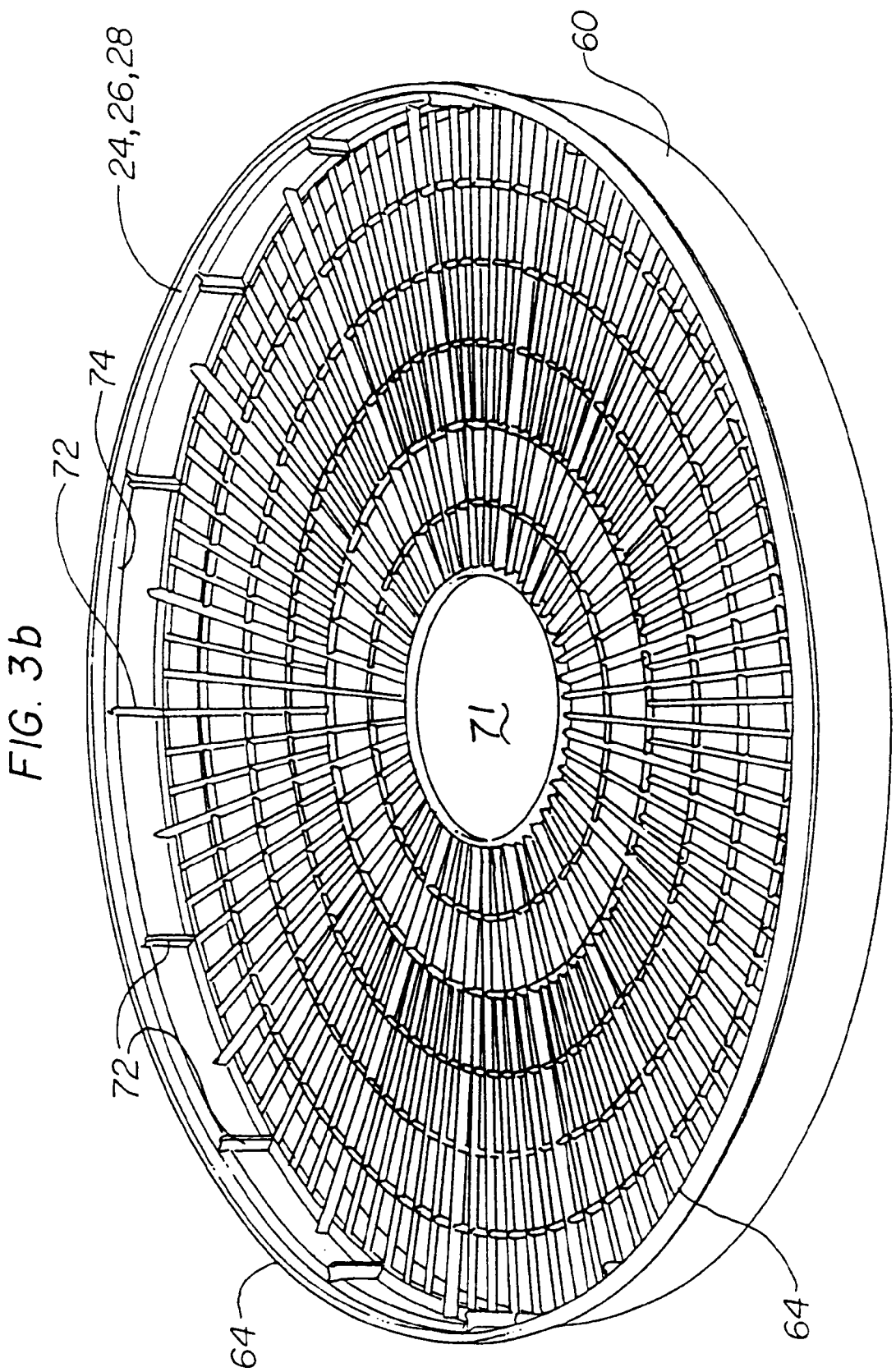

FIGS. 3a and 3b are top and bottom perspective views of the food trays 24, 26, and 28, respectively. The food trays 24–28 are preferably identical. Sidewall 60 has a top edge 62 and a flared bottom edge 64. Support surface 66 includes a series of radial support members 68 and ribs 70 located on the inside perimeter of the sidewall 60. The support surface 66 is preferably an open mesh structure that permits heated air to reach the underside of food items located thereon. Alternatively, the horizontal air flow also the support surface 66 to be solid or non-porous, to permit the drying of liquid or semi-liquid materials, with no blockage of air movement. A central opening 71 is preferably located in the center of the support surface 66.

As best seen in the bottom view of FIG. 3b, the food tray 24–28 includes a series of spaced supports 72 that extend above a ridge 74 formed by the flared bottom edge 64. The spaced supports 72 are positioned to engage with the top edge 46 of the base 22 or the top edge 62 of an adjacent food tray. In the stacked configuration illustrated in FIG. 1, the flared bottom edge 64 of the food tray 24 extends around the top edge 46 of the base 22, but the spaced supports 72 prevent the ridge 74 from engaging directly with the top edge 46. Consequently, a small gap is maintained between the food tray 24 and the base 22. Similarly, the spaced supports 72 on the food trays 26–28 maintains a small gap with the food trays 24–26, respectively, when in a stacked configuration. The small gaps operate as outlet vents 150–156 (see FIG. 1).

Figure 4B:
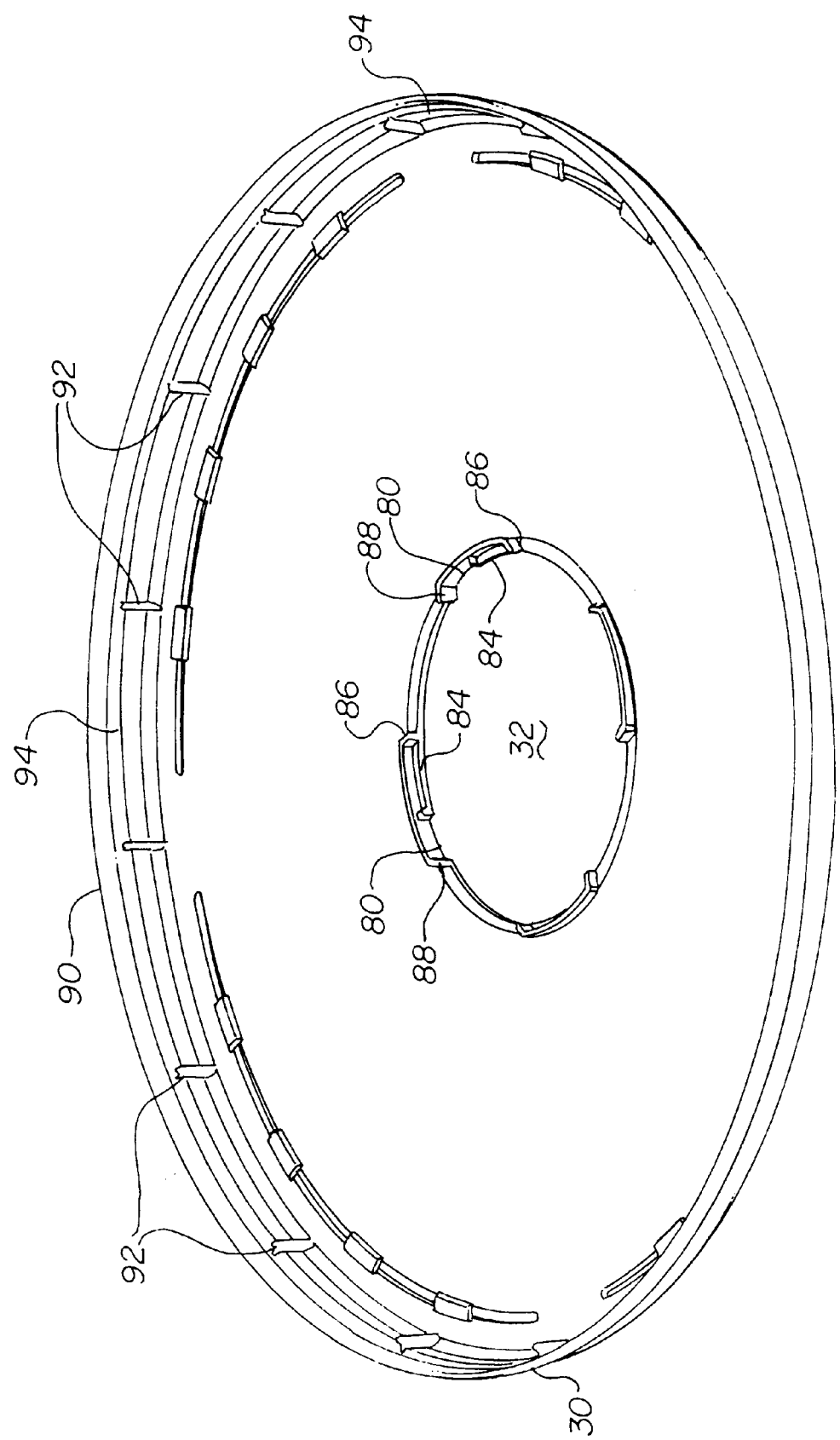

FIGS. 4a and 4b are top and bottom perspective views of the cover 30, respectively. A series of slots 80 are arranged around a perimeter 82 of the central opening 32. Portions of the perimeter 82 form ridges 84 adjacent to the slots 80 for engaging with corresponding protrusions 124 on the detachable heater blower assembly 34 (see FIG. 5). Stops 86 are located underneath the ridge 84 to limit the movement of the protrusions 124. Slide surfaces 88 are located adjacent to the slots 80 opposite the ridges 84 to facilitate engagement with the protrusions 124.

As best seen in FIG. 4b, the cover 30 has a flared bottom edge 90 with a series of space supports 92 positioned to engage with the top edge 62 of the food tray 28. The spaced supports 92 extend above a ridge 94 formed by the flared bottom edge 90 so that a small gap is formed between the ridge 94 and the top edge 62 of the food tray 28. The gap forms outlet vent 156 (see FIG. 1). In an alternate embodiment, the cover 30 may optionally include outlet vents 96 located near the flared bottom edge 90.

FIG. 5 is a prospective view of the detachable heater blower assembly 34. Housing 100 includes a handle 102, a central portion 104, and an air distribution portion 106. The central portion 104 includes a series of top inlet vents 108 and side inlet vents 110 through which outside air is drawn into the detachable heater blower assembly 34. Protrusions 124 at the base of the central portion 104 are arranged for engagement with the slots 80 in the central opening 32 on the cover 30.

Figure 6:
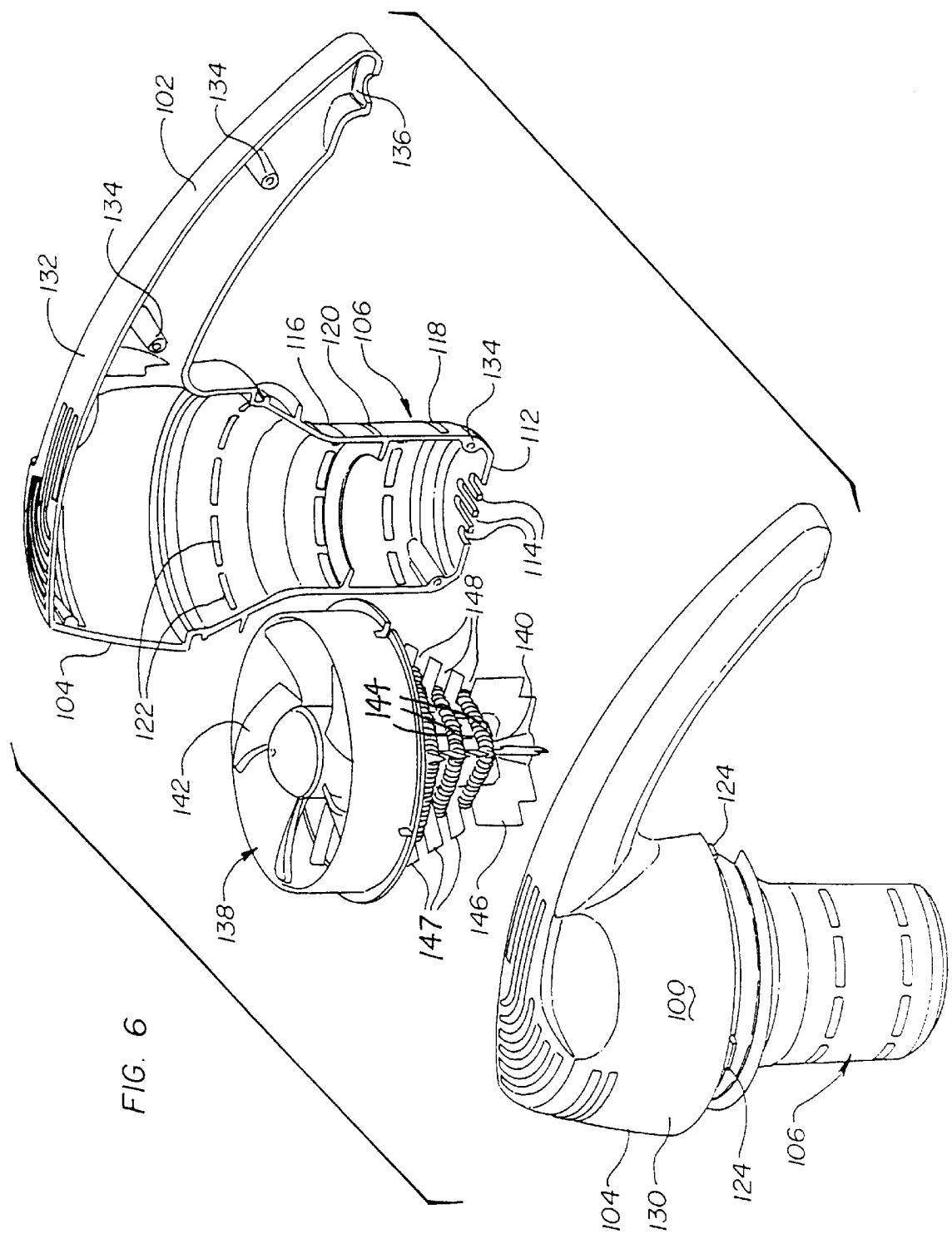
FIG. 6 is an exploded perspective view of the heater blower assembly of FIG. 5.

As illustrated in FIG. 6, bottom surface 112 of the air distribution portion 106 includes first blower ports 114. Cylindrical sides 116 of the air distribution portion 106 includes second blower ports 118 and third blower ports 120 arranged around the perimeter thereof. Fourth blower ports 122 are located around the perimeter of the air distribution portion 106 near the central portion 104. The air distribution portion 106 operates as an air plenum for directing pressurized, heated air into the dehydrator module 36, preferably horizontally above and below the support surfaces 66.

The housing 100 comprises a left portion 130 and a right portion 132. The right portion 132 includes a series of holes 134 for receiving screws that engage with the left portion 130. The distal end of the handle 102 includes a power cord opening 136. A standard power cord, plug and strain relief (not shown) extends through the hollow handle 102 for engagement with a heater blower module 138. The power supply may either be connected directly or a switch (not shown) may be added to the handle.

The heater blower module 138 includes a motor 140 attached to a fan blade 142. A support structure 146 surrounds the motor 140 and securely retains it in the housing 100. A heater coil 144 is wound around a series of slots 148 on the support structure 146. The support structure 146 is preferably constructed of a high temperature material, such as phlogopite or muscovite mica. In the preferred embodiment, the support structure 146 is mica—0.81 mm (0.032) inches thick. The housing 100 is preferably constructed of a high temperature thermoplastic such as polypropylene. The support structure 146 shown in FIGS. 1a and 6 is typical of those used in hand held hair dryers in which three or more X-shaped mica plates 147 are assembled into an arrangement and the coiled heating wire 144 is wrapped around the plates. A segment of fiberglass yarn is typically hand-threaded through the coils (not shown) as reinforcement to prevent the heater coil from breaking and safeguard against electrical hazard.

The motor 140 is preferably axial with a rating of about 12 VDC driven at about 9 VDC to obtain about 4000 rpms. The heater coil 144 is preferably a resistance element having a heating capacity of about 360 watts, 120 VAC at 50–60 Hz. The heater coil 144 may be divided into two parts, so that a portion acts in series with the motor 140 and a portion acts in parallel. This configuration serves to step down the voltage to the motor so that the output temperature of the heater coil 144 is about 63° C. (145° F.). The portion of the resistance wire 144 that is in series with the motor 140 is about 37 Ohms. The portion of the resistance wire 144 that is in series is about 3.33 Ohms. It will be appreciated that these values may be adjusted for a variety of reasons, such as for example, due to adjustments in the venting or fan design. A fuse (not shown) is preferably located adjacent to the heater coil 144 to turns off the power if the temperature in the dehydrator 20 exceeds a predetermined temperature. A thermostat or thermistor (not shown) may also be used to maintain a target temperature within the dehydrator.

Figure 7:
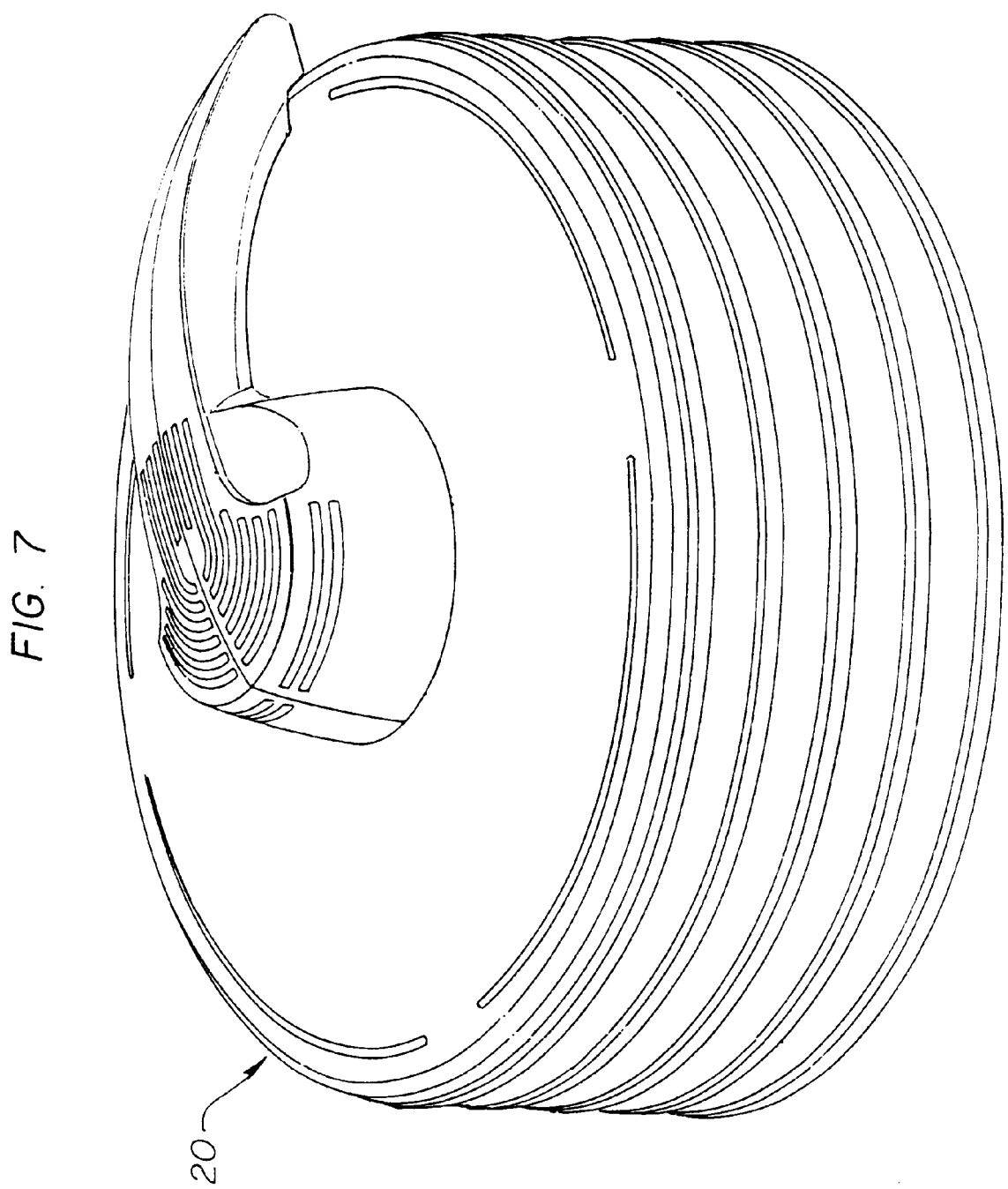
FIG. 7 is a prospective view of the present food dehydrator.
Figure 8A:
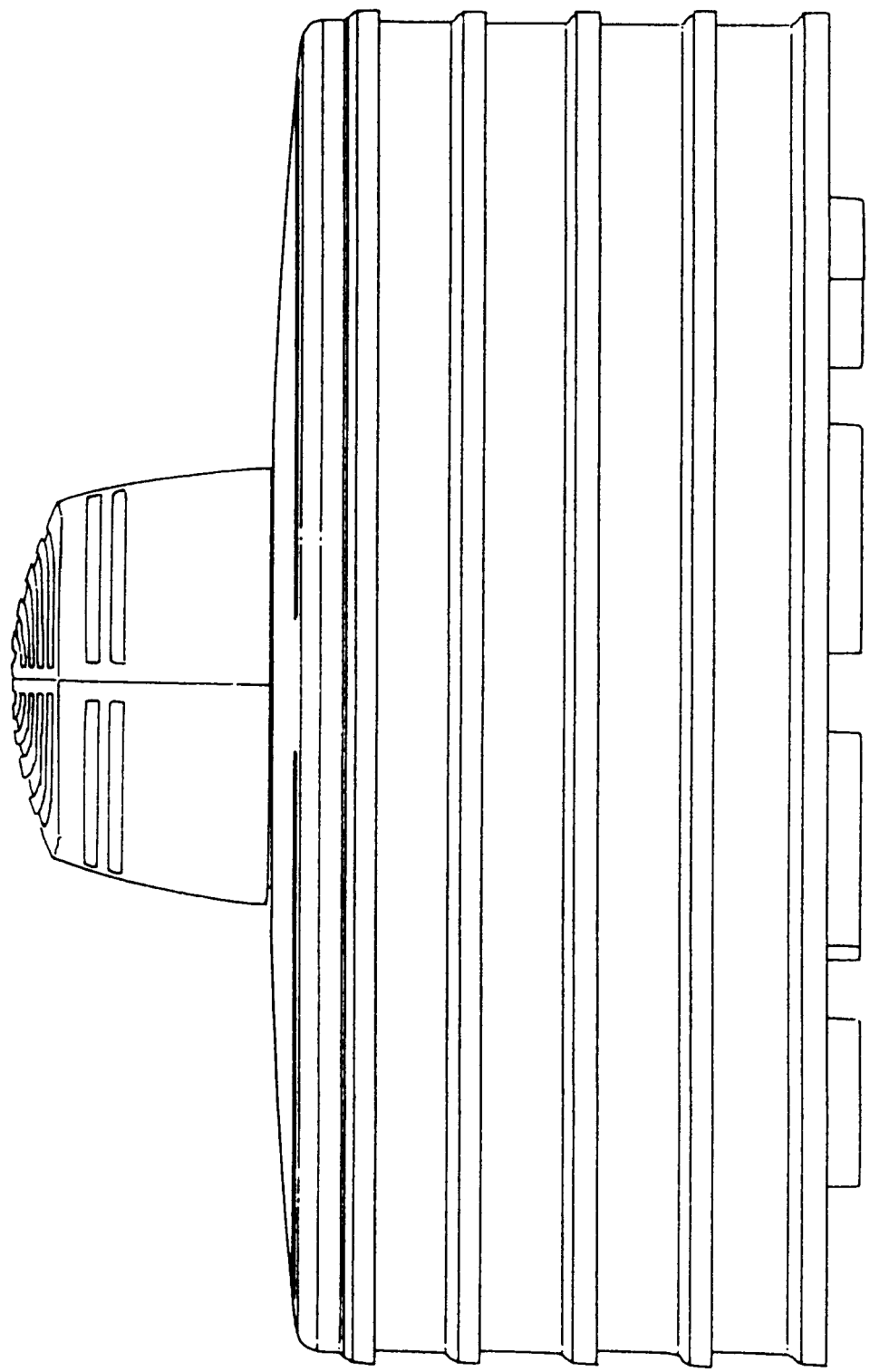
FIG. 8a is a front view of the food dehydrator of FIG. 7.
Figure 8C:
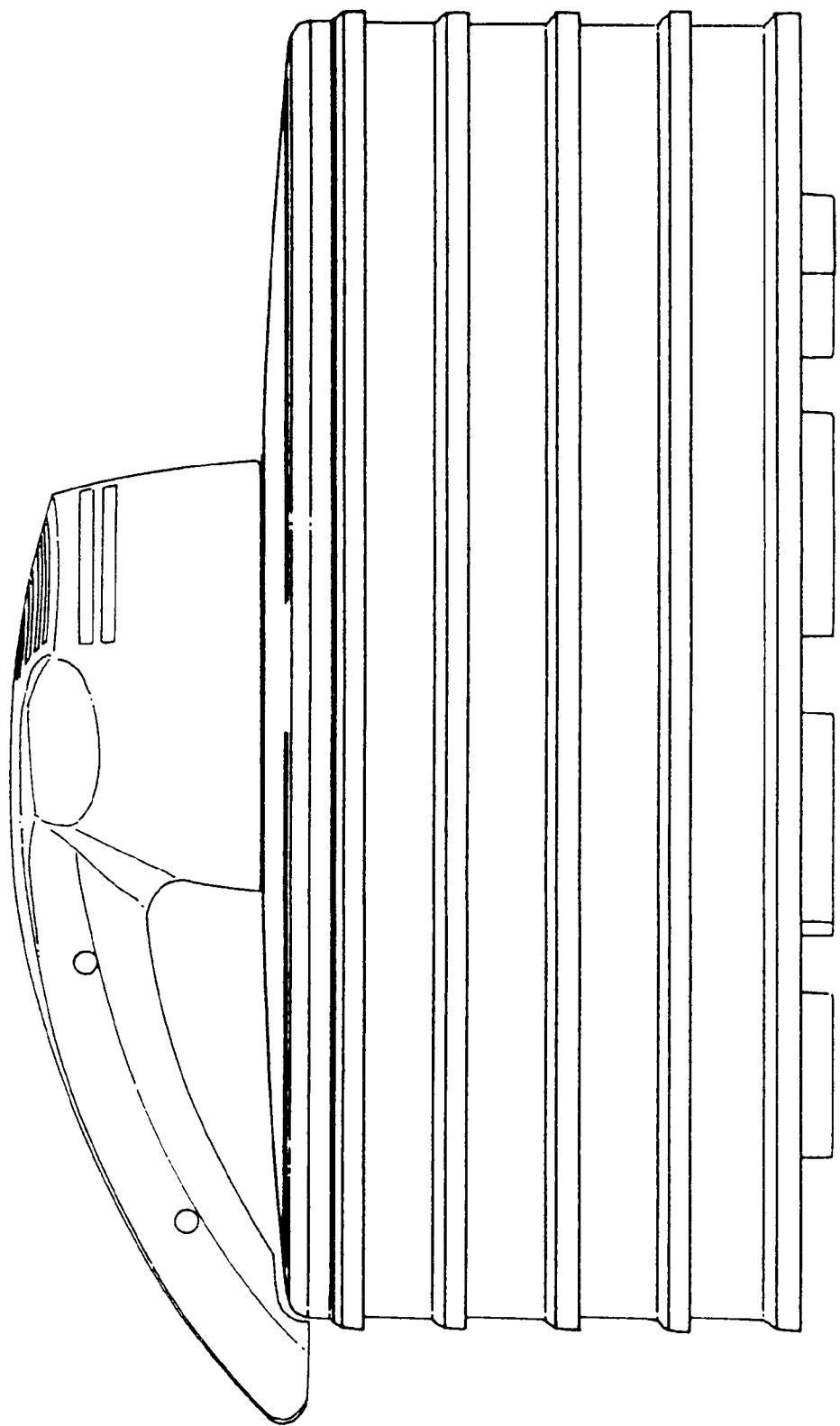
FIG. 8c is a side view of the food dehydrator of FIG. 7.
Figure 8D:
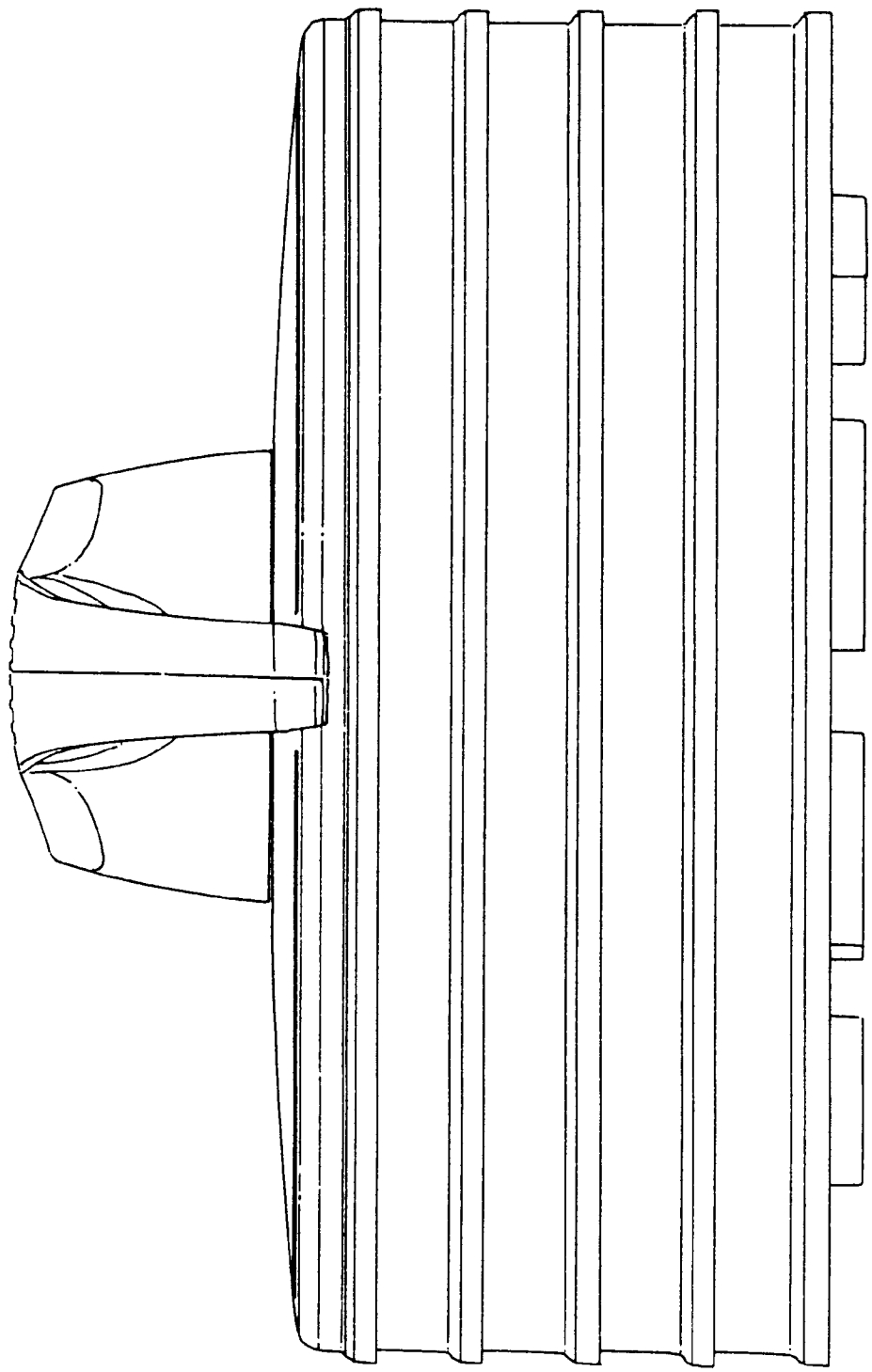
FIG. 8d is a rear view of the food dehydrator of FIG. 7.
Figure 8E:
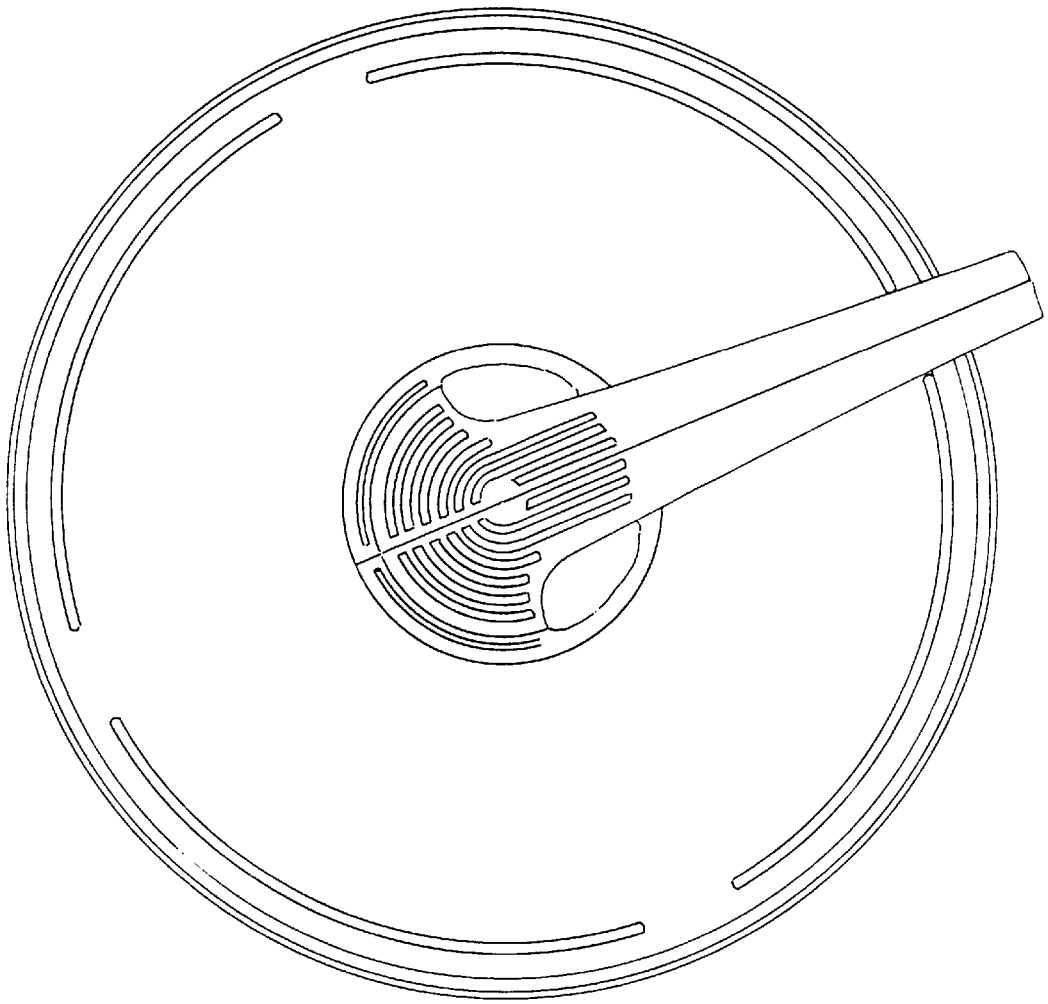
FIG. 8e is a top view of the food dehydrator of FIG. 7.
Figure 8F:
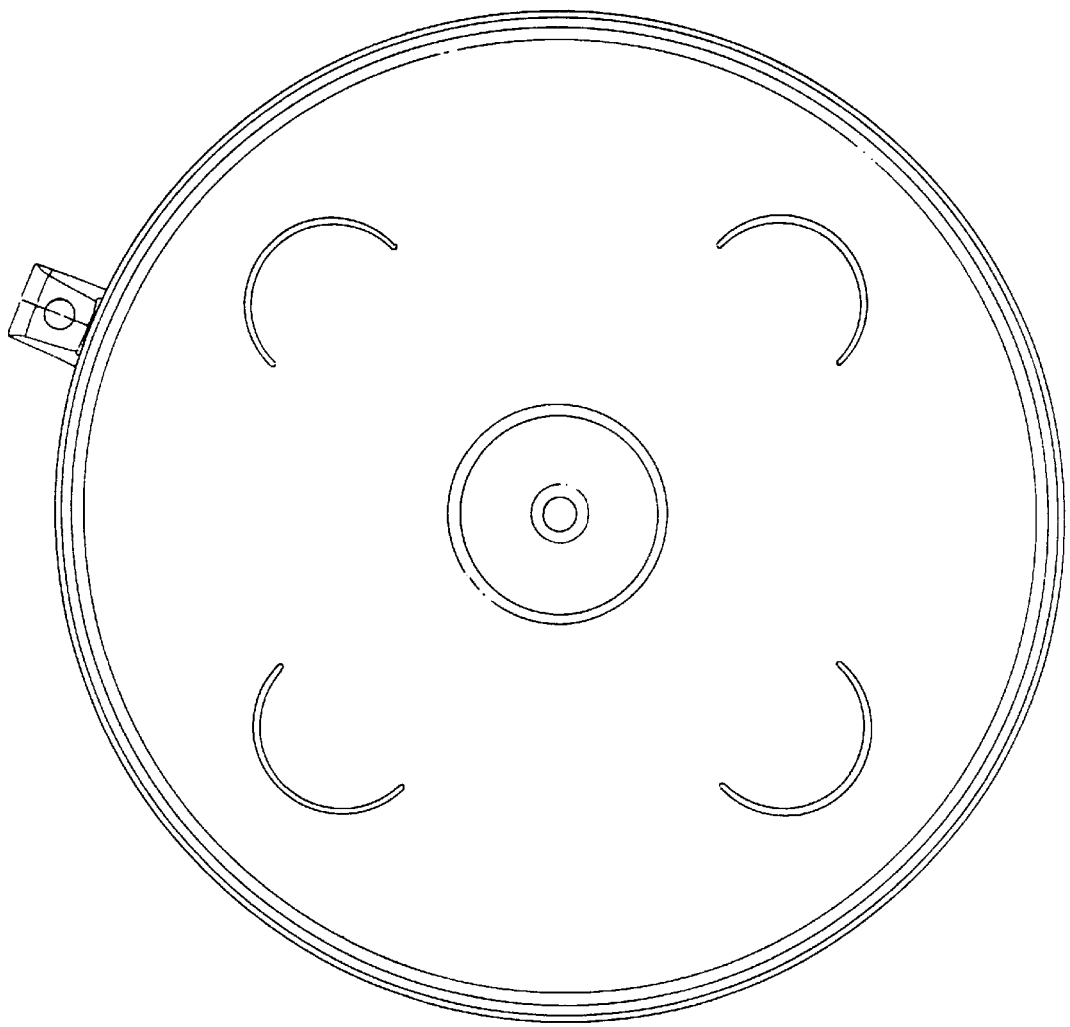
FIG. 8f is a bottom view of the food dehydrator of FIG. 7.
Figure 11:
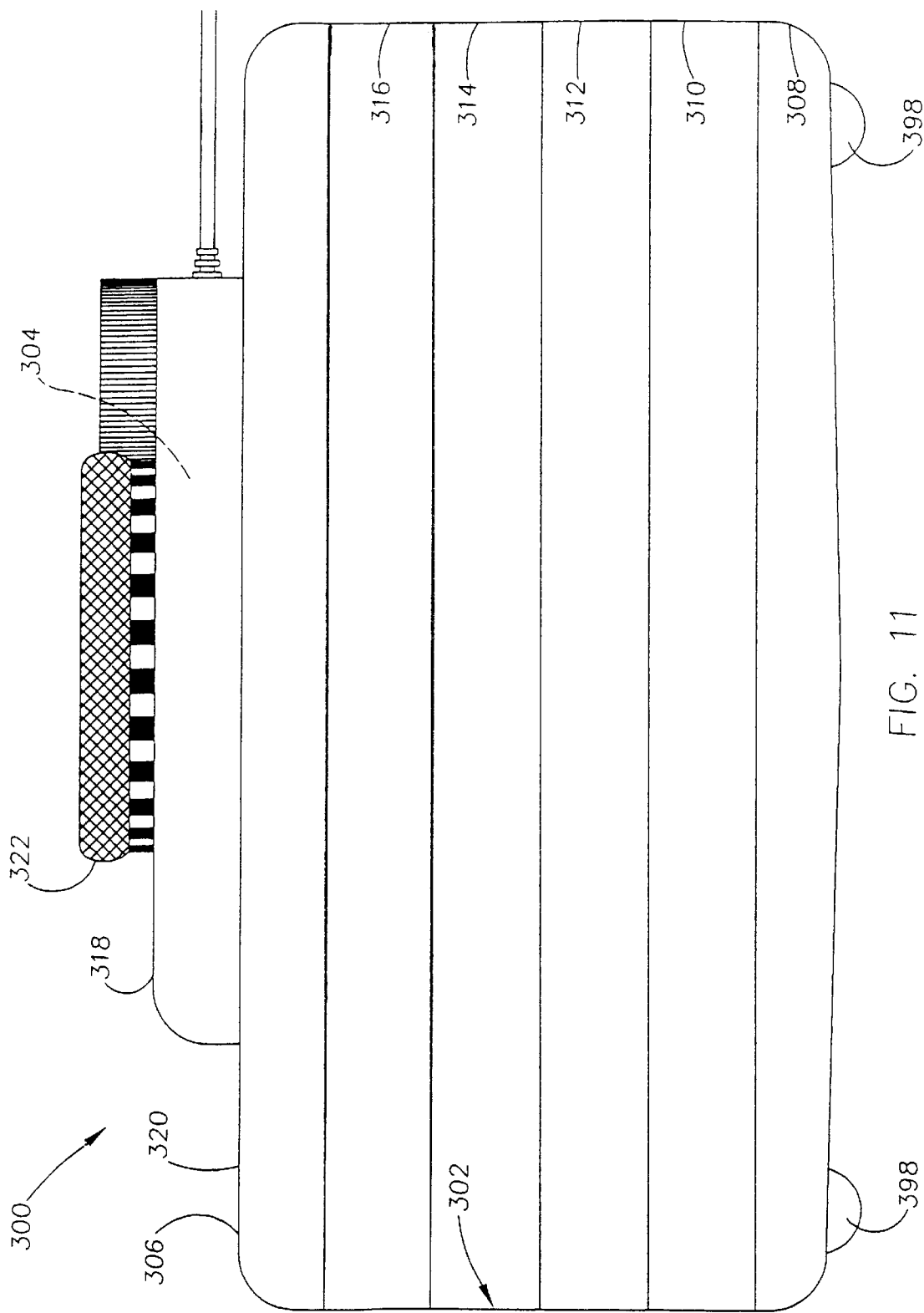
FIG. 11 is a side view of another alternate food dehydrator.
Figure 12:
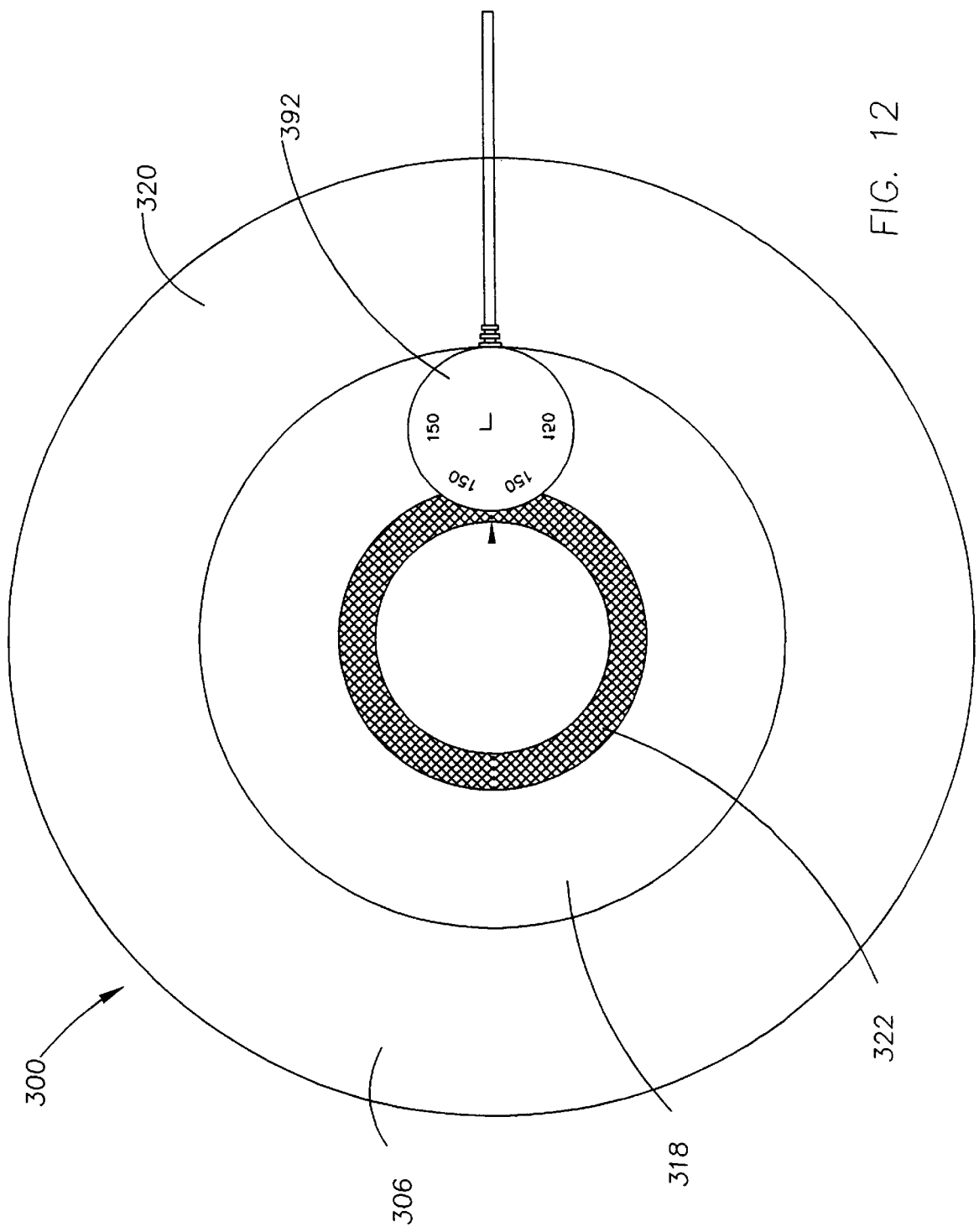
FIG. 12 is a top view of the food dehydrator of FIG. 11.
Figure 13:
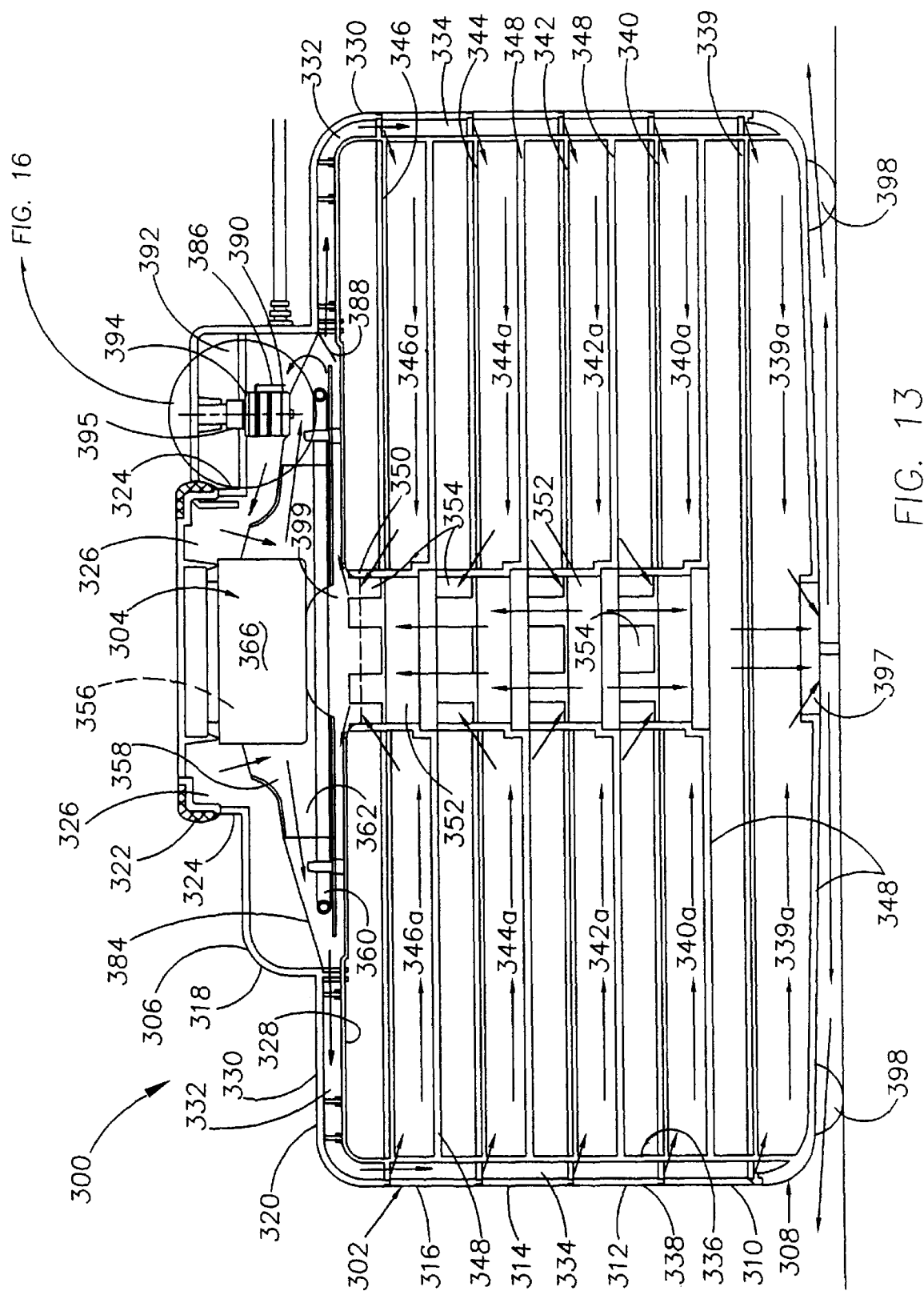
FIG. 13 is a sectional side view of the food dehydrator of FIG. 11, showing air flow through the dehydrator.
Figure 14:
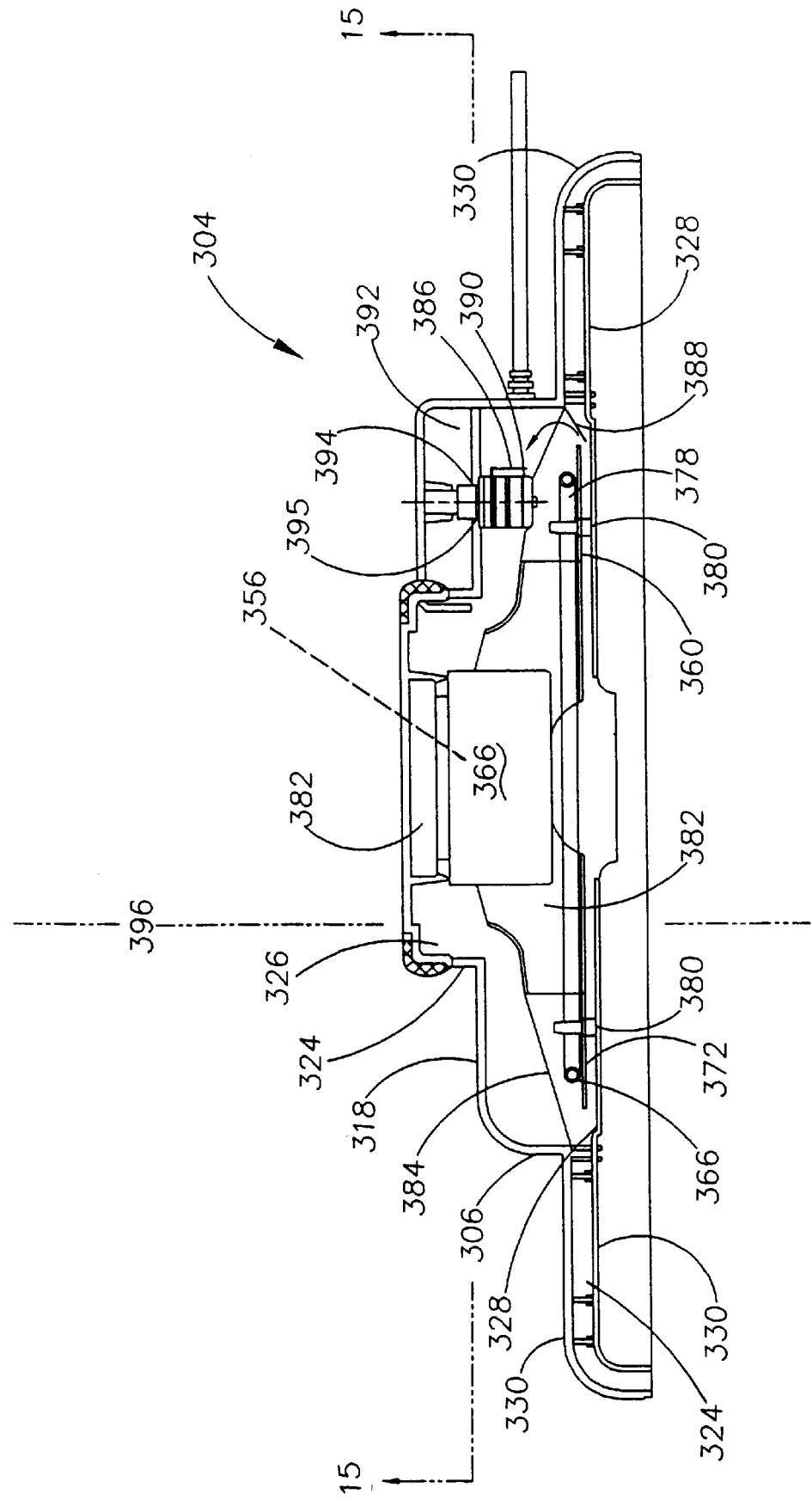
FIG. 14 is a sectional side view of the heater blower assembly of FIG. 13.

FIG. 7 is a perspective view of the present food dehydrator 20. FIGS. 8a through 8f are plan views of the food dehydrator of FIG. 7. The food dehydrator 20 is about 30.5 cm (12 inches) in diameter and about 19.05 cm (7.5 inches) high. The heater blower assembly 34 extends about 6.35 cm (2.5 inches) above the cover 30.

As is best illustrated in FIGS. 1a and 1b, the detachable heater blower assembly 34 is engaged with the dehydrator module 36 by inserting the air distribution portion 106 through the central opening 32 of the cover 30. The air distribution portion extends downward through the central openings 71 of the food trays 24–28. The protrusions 124 on the central portion 104 are aligned with, and inserted into, the slots 80 on the cover 30. The detachable heater blower assembly 34 is then rotated counterclockwise so that the protrusions 124 slide along the bottom of the ridges 84 until they engage with stops 86. Slide surfaces 88 prevent the heat detachable heater blower assembly from rotating in the clockwise direction.

When the detachable heater blower assembly 34 is fully engaged with the dehydrator module 36, the first blower ports 114 are positioned above the flow diverter 50 so that heated air 114a is directed across the floor 42 of the base 22 and along the bottom surface of the support surface 66 of food tray 24 (see FIGS. 5 and 6). The second blower ports 118 are positioned to direct heated air 118a across the top of the support 66 of the food tray 24 and the bottom of the support surface 66 of the food tray 26. The third blower ports 120 are positioned to direct heated air 120a across the top of the support surface 66 of the third food tray 26 and the bottom of the support surface 66 of the fourth food tray 28. The fourth blower ports 122 are positioned to direct heated air 122a across the support surface 66 of the food tray 28. The air distribution portion divides the heated air into separate portions. The blower ports 114, 118, 120, 122 preferably divide the heated air into equal portions so that each tray 22–28 received a generally equal quantity of air at generally equal velocities.

As discussed above, the spaced supports 72 engage with the top edge 46 of the base 22 so that a first outlet vent as indicated by the arrow 150 is formed around the perimeter of the sidewall 44. Similarly, outlet vents indicated by arrows 152, 154, and 156 are formed around the perimeter of the sidewall 60 of the food trays 24–28, respectively. Alternatively, outlet vents 96 formed directly in the cover 30 may supplement and/or may be substituted for the outlet vent 156 (see FIG. 4a).

Locating the heater blower module 138 close to the center food trays 22–28 provides for the shortest path to the food and minimizes loss in air velocity and heat. Heat generated by the motor 140 is also retained within the dehydrator module 36. There is only one right angle bend in the air flow before the heated air reaches the food, minimizing velocity losses. Additionally, the heated air passes over only one of the trays 22–28 before it exits through one of the outlet vents 150–156, minimizing the contact of moist air with the food items.

FIG. 9 is an exploded side sectional views of an alternate food dehydrator 200 of the present invention. The food dehydrator 200 includes a dehydrator module 202 and a detachable heater blower assembly 204. The dehydrator module 202 includes a base 206 on which may be stacked a series of food trays 208, 210 and 212. A cover 216 extends across the top of the food tray 212. The detachable heater blower assembly 204 extends downward through a central opening 218 in the cover 216 and central openings 220 in the food trays 212. In an alternate embodiment, the heater blower assembly 204 is permanently attached to the dehydrator module 202, as discussed above.

The cover 216 includes an inner wall 222 that defines an air duct 224. Similarly, an air duct 226 is defined between inner walls 228 and outer walls 230 around the perimeter of the food trays 208–214. The inner walls 228 and outer walls 230 may be connected by a variety of supports (not shown) that provide minimal resistance to air flow through the air duct 226, such as disclosed in U.S. Pat. No. 5,423,249 (Meyer). When in the stacked configuration illustrated in FIG. 10, the air duct 224 is in fluid communication with the air duct 226. The inner walls 228 are preferably shorter than the outer walls 230 to form a plurality of blower ports 270, 272, 274, 276 around the outer perimeter of the support surfaces 234 for directing the heated air flow radially inward. In an alternate embodiment, the inner walls 230 may include a plurality of perforations that function as blower ports. See generally, U.S. Pat. No. 4,190,965 (Erickson); U.S. Pat. No. 4,224,743 (Erickson et al.); U.S. Pat. No. 4,536,643 (Erickson); U.S. Pat. No. 5,420,393 (Dornbush et al.); U.S. Pat. No. 5,423,249 (Meyer).

The support surfaces 234 extend from the inner walls 228 to a hub-like walls 240 at the center of the food trays 208–214. The hub-like walls 240 serve to form an inner duct 244. The hub-like walls 240 include a plurality of slots 242 in fluid communication with the inner duct 244.

The detachable heater blower assembly 204 includes a housing 250 with a series of top inlet vents 252 and side inlet vents 254 through which outside air is drawn into the detachable heater blower assembly 204 (see FIG. 10). Protrusions 256 are arranged for engagement with corresponding slots (not shown) in the central opening 118 on the cover 216. At the base of the housing 250 is an air distribution portion 258 that directs heated air into the air ducts 224 and 226.

The heater blower module 260 includes a motor 262 attached to a fan blade 264. A support structure 266 surrounds the motor 262 and securely retains it in the housing 250. A heater coil 268 is supported by a series of slots 270 on the support structure 266. The support structure 266 is preferably constructed of a high temperature material, such as phlogopite or muscovite mica.

A thermostat or thermistor (not shown) may also be used to maintain a target temperature within the dehydrator. The thermostat would be positioned inside the heater blower module 260 in proximity to the heater coils 268, and exposed to incoming fresh air passing into the heater blower module 138.

FIG. 10 illustrates a food dehydrator 200' that is a variant of the food dehydrator 200. The food dehydrator 200' includes a fourth food tray 214 to emphasize that the design of the flow path in the food dehydrator 200 is independent of the number of food trays utilized. The food dehydrators 200, 200' are the same in all other respects and common reference numeral are used.

As best illustrated in FIG. 10, when the detachable heater blower assembly 204 is fully engaged with the dehydrator module 202, the first blower port 270 directs heated air 270a across the top of the support surface 234 of the food tray 208 and along the bottom of the support surface 234 of the food tray 210. The second blower port 272 direct heated air 272a across the top of the support surface 234 of the food tray 210 and along the bottom of the support surface 234 of the food tray 212. The third blower port 274 direct heated air 274a across the top of the support surface 234 of the food tray 212 and along the bottom of the support surface 234 of the food tray 214. The fourth blower port 276 direct heated air 276a across the top of the support surface 234 of the food tray 214. When the trays 208–214 are stacked together, the air duct 226 forms a continuous pressurized plenum chamber surrounding the trays and extending substantially from the top to the bottom of the dehydrator module 202. Due to the generally uniform pressure distribution within the air duct 226, blower ports 270–276 preferably divide the heated air into equal portions so that each tray 208–214 received a generally equal quantity of air at generally equal velocities.

The heated air 270a–276a then flows through the slots 242 into the inner duct 244. The heated air 270a–276a is exhausted to the environment through an outlet vent 278 in the bottom of the base 206. Legs 280 on the base 206 maintain an air gap that permits the free flow of the heated air 270a–276a. A portion of the heated air 270a–276a is preferably drawn back into the air duct 224 through an opening 282 by a Bernoulli effect. In particular, the relatively high air velocity through the heater blower assembly 204 to the air duct creates a low pressure condition that draws or siphons air through opening 282. Permitting a portion of the heated air to be recirculated, rather than being exhausted out the outlet vent 278 provides the added benefit of minimizing back pressure near the top trays 212, 214, especially if the number of food trays is increased.

The speed of food drying is influenced primarily by three factors: air moisture content, air temperature and air velocity. Supplying the heated air 270a–276a from the outer perimeter of the food trays 208–214 insures that the warmest and driest air encounters the larger surface area of the support surfaces 234 at the perimeter of the food trays 208–214. As the air cools and absorbs moisture as it moves radially inward. However, the velocity of the heated air increases as it moves radially inward, compensating, in large part, for the increase moisture content and lower temperature of the air. Recirculating a portion of the heated air 270a–276a also conserves energy, since the air is already heated, although the air also has a higher moisture content.

FIGS. 11–17 depict an alternate food dehydrator 300 of the present invention. The food dehydrator 300 includes a dehydrator module 302, a heater blower assembly 304, and a cover 306. The dehydrator module 302 includes a base 308 on which a series of food trays 310, 312, 314, and 316 may be stacked. The cover 306 is detachable and extends across the top of the food tray 316. The cover 306 has a center portion 318 and an outer portion 320. The cover 306 can include a textured portion 322 to facilitate gripping of the cover, for example, a ring-shaped grip made of a textured rubber elastomeric material.

The cover 306 includes one or more side vents 324 through which outside air is drawn into an air intake slot 326 and to the heater blower assembly 304. The cover 306 includes an inner wall 328 and an outer wall 330 that defines an air duct 332. An air duct 334 is defined between inner walls 336 and outer walls 338 around the perimeter of the base 308 and the food trays 310–316. When the food trays are stacked on the base, the air duct 332 is in fluid communication with the air duct 334. The inner walls 336 of the base and the food trays are preferably shorter than the outer walls 338 to form a plurality of blower ports 339, 340, 342, 344, 346, around the outer perimeter of the support surfaces 348 to direct the heated air flow radially inward. The inner walls 336 may include a plurality of perforations that function as blower ports, as discussed above with regard to FIG. 9. The support surfaces 348 of the food trays 310–316 of the food dehydrator 300 include hub-like walls 350 at the center of the food trays that form an inner duct 352. A plurality of slots 354 of the hub-like walls 350 are in fluid communication with the inner duct 352.

The heater blower assembly 304 includes a motor 356, a blower 358, and a heater assembly 360. The motor 356 of the food dehydrator 300 is preferably a brushless DC type motor such as those used in computer cooling fans which are commercially available, for example, from Sunonwealth Electric Machine Industry Co., Ltd. Such motors are compact and relatively quiet, both with respect to audible noise and electrical disturbances. Noise reduction is a desirable feature in a food dehydrator, which can be operated for a period of hours to days at a time. In addition, the absence of brushes in the motor helps to indefinitely extend the life of the motor.

The blower 358 is a centrifugal (radial) blower that includes a series of blades 362 mounted in a housing 366. The housing 366 has an inner surface 370 and is sized to receive the motor 356 therein. The construction of the motor 356 and the blower 358 as a unitary piece with the motor 356 built into a hub 368, provides a low profile assembly, as well as cooling of the motor 356 during operation from the air flowing through the blower 358 past the motor.

Figure 15:
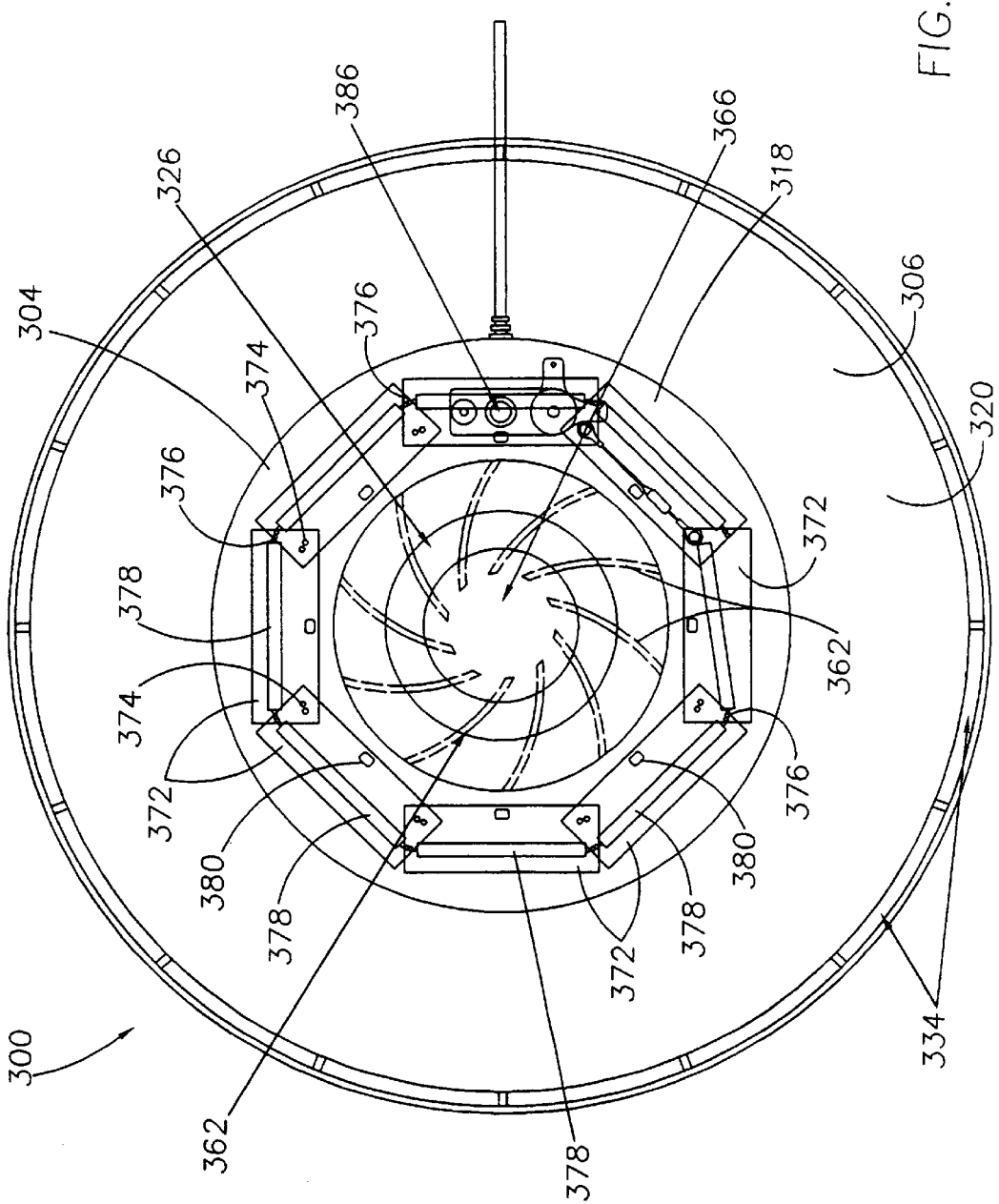
FIG. 15 is a cross-sectional view of the heater blower assembly of FIG. 11, taken along line 15—15.
Figure 16A:
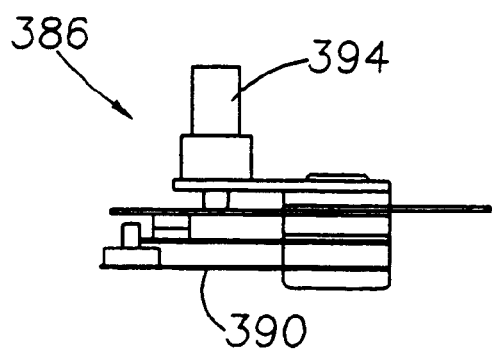
FIG. 16a is a side view of the thermostat of the food dehydrator of FIG. 13.
Figure 16B:
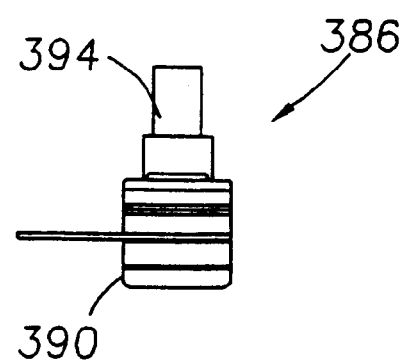
Figure 17A:
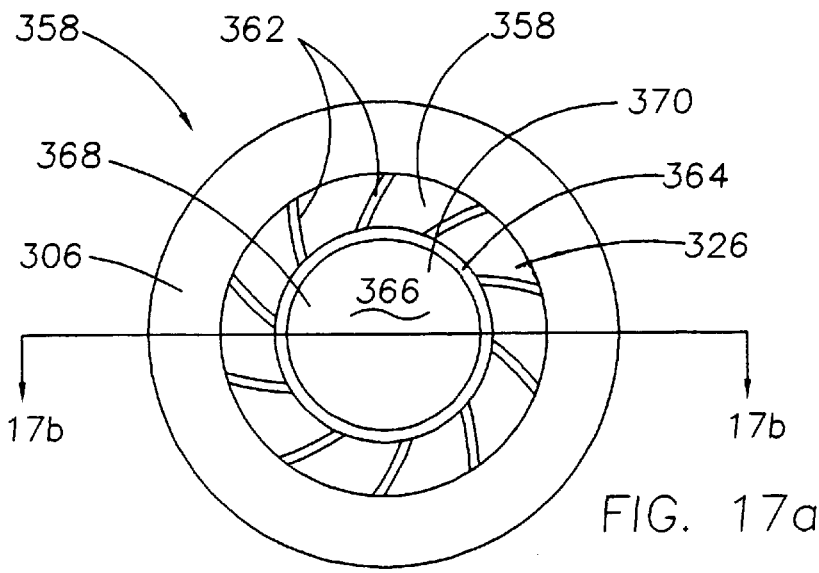
FIG. 17a is a top view of the blower heater and motor housing of the heater blower assembly of FIG. 14.
Figure 17B:
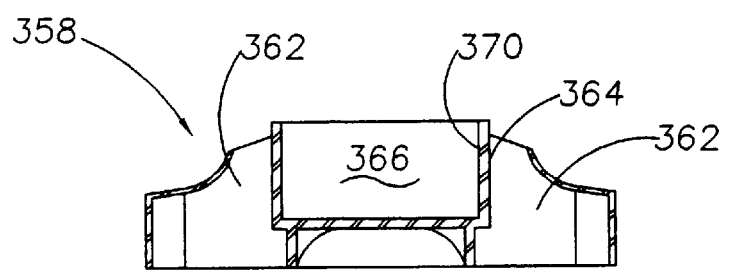
Figure 17C:
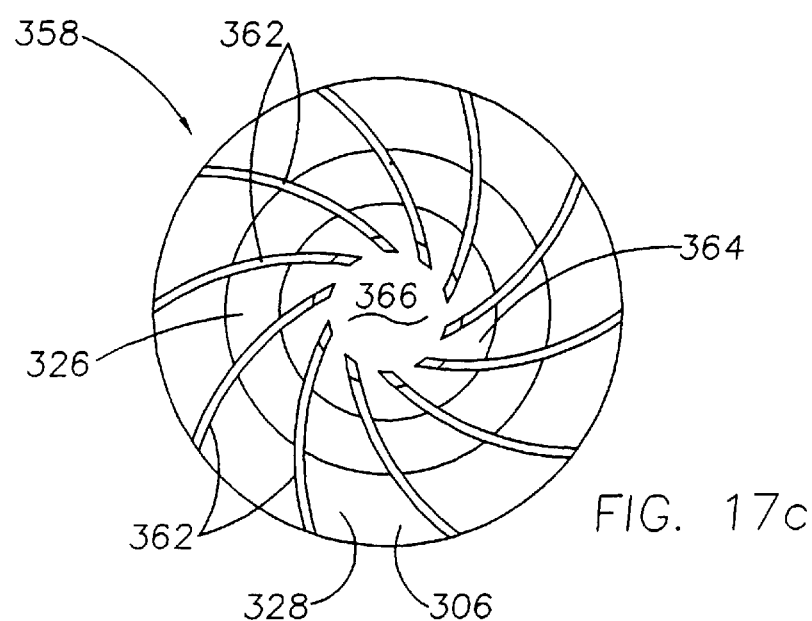

Referring to FIG. 15, the heater assembly 360 includes a series of flat, rectangular shaped insulation plates 372 assembled together to form a flat ring. The insulation plates 372 are preferably constructed of a high temperature material, such as phlogopite or muscovite mica. Holes 374 are used for alignment purposes during assembly of the heater assembly. Metal eyelets or other suitable fasteners 376 attach an about equal segment of coiled heating wire 378 to each of the insulation plates 372 of the multi-segmented heater assembly 360, and attach the insulation plates 372 to each other.

Due to the use of multiple fasteners 376 to mount the heating wire 378 in the heater assembly 360, there is little risk of breaking or mislocating the heater coils 378 during assembly and use. As a result, the use of fiberglass yarn segments to reinforce the wire coil is unnecessary. Further, since the plates 372 are rectangular-shaped rather than X-shaped, there is little or no wasted mica material in the manufacture of the insulating plates 372. In addition, the flat ring heater assembly 360 is mounted parallel to the direction of the airflow that exits circumferentially from the blower 358, resulting in minimal air noise and air flow resistance compared to the heater blower assembly 260 of FIGS. 9–10.

The ring-shaped heater assembly 360 is positioned below the blower and motor assembly 356, 358 along the outer perimeter of the blades 362. The plates 372 are mounted on support members 380 attached to the inner wall 328 of the cover 306. The support members 380 are structured to maintain the plates 372 at a distance from the surface of the inner wall 328 of about 0.125 inches (3 mm). The inner and outer walls 328, 330 of the center portion 318 of the cover 306, which extend over and support the heater assembly 360, is composed of a flame retardant plastic. The outer portion 320 of the cover 306 can be composed of a lower cost, UL HB-rated plastic material.

The heater blower assembly 304 is mounted on the inside wall 328 of the center portion 318 of the cover 306. Preferably, the motor 356 is attached to the cover 306 by means of a fastening mechanism 382 that will removably receive the motor 356 therein, or by a coupling member such as a bolt, snap, or other fastener.

A ring-shaped, heat shield member 384 extends from the cover 306 to near the ends of the blades 362 as a covering over the heater assembly 360. The heat shield member 384 functions to contain the heat generated from the heating wires 378 within the area through which air flows outward from the blower 358 toward the air ducts 332, 334 and away from the cover 306. The heat shield member 384 also helps guide the air flow in the direction of the air ducts.

As shown in FIGS. 13–16, a thermostat 386 is positioned on the heat shield 384. Air contacting the thermostat 386 is diverted from its path to the food trays by a small blade or louver 388 made of a metal or plastic material, that extends downward into the air stream. The air is directed past a bi-metal sensing blade 390 and drawn into the stream of incoming air, and recirculated into the blower 358. The sensing blade 390 provides a temperature reading of the air that is being circulated in the system. The thermostat 386 is connected to a temperature adjustment knob 392 via a shaft 394 that extends through an opening 395 in the cover 306. The user can adjust the temperature of the heater assembly 360 by setting the temperature adjustment knob 392 to a desired temperature marked on the knob.

In operation, the centrifugal blower 358 draws air in through the side inlet vents 324 of the cover 306, into the air intake slot 326, and into the blower 358 along its axis 396. The air is then expelled out of the blower at a right angle to the axis 396 over the heater assembly 360, and directly into the air ducts 332, 334. The blower ports 339–346 direct the heated air 339a–346a across the support surfaces 348 of the base 308 and the food trays 310–316. The heated air 339a–346a flows inward through the slots 354 into the inner duct 352. The heated air 339a–346a is exhausted to the environment through an outlet vent 397 in the bottom of the base 308. Legs 398 attached to the base 308 maintain an air gap that permits the free flow of the air 339a–346a out of the dehydrator. A portion of the air 339a–346a is preferably drawn through the air duct 352, and upward through an opening 399 into the underside of the blower 358 by the negative pressure created by the blower 358. The returned air is then mixed with fresh air entering into the air intake slot 326, blown over the heater assembly 360, and then recirculated through the system.

Because of the compactness of the heater blower assembly 304, the assembly can be housed within the cover 306 rather than requiring it to be fitted into the center of the food trays, while maintaining an overall height for the food dehydrator 300 that is acceptable to consumers. The placement of the motor 356 in the cover 306 of the food dehydrator 300 also moves the motor out of the stream of warm air returning from the food trays, and makes it easier to maintain the motor at an acceptable temperature during operation.

Advantageously, the food dehydrator 300 does not require a separate air deflector, as in the food dehydrator 200. The axial type fan of food dehydrator 200 blows air along its axis 261, and an air distribution portion 256 is used to change the vertical flow of air to a horizontal flow into the air ducts 224 and 226. The use of a centrifugal (radial) type fan in food dehydrator 300, which intakes air along its axis 396 and expels the air outward at a right angle to the axis 396, increases fan efficiency and eliminates the need for a separate air deflector which provides a more compact system. The additional contribution of the heat shield member 384 in guiding the air flow outward from the blades 362 to the air ducts 332, 334, also enhances the efficiency of the system.

The centrifugal blower 358 is capable of delivering air at a static pressure of at least about 0.15 in. $H^2O$, to evenly distribute the incoming or recirculating air to each of the food trays, preferably about 0.2 in. $H^2O$. By comparison, an axial type fan can deliver air at a static pressure of about 0.1 in. $H^2O$ or less.

The food dehydrator 300 also provides for highly accurate control of the temperature of the circulating air. In use, the centrifugal blower 358 draws intake air from the side inlet vents 324 and the air inlet slots 326 positioned in a circle around the blower 358. In addition, the blower 358 generates negative pressure that draws the air from the inner duct 352 upward through the underside of the blower 358. This returned air is mixed with fresh air entering through the air intake slots 326 and the top of the blower 358, and the combined fresh and recirculated air is then blown over the heater assembly 360 and heated. This system provides for improved temperature control of the circulating air, and more effective pressurization of the food trays 310–316, with little or no reliance on a siphoning/Bernoulli effect to recirculate the air in an upward direction, as with the food dehydrator 200.

A key factor to evenness of drying is the convergent airflow by which air accelerates as it converges to the center, compensating for cooling and increased moisture content. Moving the heated airflow horizontally over the food, rather than vertically through the trays, also provides for more uniform drying of food items from tray to tray. The horizontal air flow also permits drying of liquid or semi-liquid materials on a solid or a non-porous support surfaces 66, 234, 348, with no blockage of air movement. The symmetrical nature of the dehydrator modules 36, 202, 302, also contributes to even distribution of heated air and more even drying of the food.

The detachable nature of the detachable heater blower assemblies 34, 204, and the compactness and detachability of the heater blower assembly 304, allows for easy storage and servicing of the food dehydrators 20, 200, 300. It is anticipated that the relatively compact, detachable heater blower assemblies 34, 204, 304, will be stored along with other kitchen appliances, while the more robust and bulkier trays 22–28, 208–214, 310–316 can be stored in another area without concern over dirt and moisture. Once the detachable heater blower assemblies 34, 204, 304, are removed from the dehydrator modules 36, 202, 302, all remaining components are dishwasher safe and can be fully immersed in water.

EXAMPLE

The dehydrating performance of the food dehydrator substantially shown in FIG. 1 (Ex. 1), utilizing outlet vents 96 in the cover rather than the outlet vents 156, was compared to four comparative units, as set forth in Table 1 below. C1 was the model FD-20 and C2 was the model FD-50, both available from American Harvest, Inc. of Chaska, Minn. C3 was the model FD15 available from Mr. Coffee of Bedford Heights, Ohio. C4 was from Ronco of Beverly Hills, Calif. The range, average drying times and system specifications for C1–C4 were taken from the instruction manuals and/or cook books provided with each of the units.

TABLE 1

|  | Example 1 | C1 | C2 | C3 | C4 |
| --- | --- | --- | --- | --- | --- |
| Fan | Yes | Yes | Yes | Yes | No |
| Thermostat | No | No | Yes | No | No |
| Number of Trays | 4 | 4 | 4 | 5 | 4.5 |
| Wattage | 360 | 300 | 550 | 260 | 60/80 |
| Operating Temp. | 145 | 145–150 | 95–147 | 151–166 | 150–153 |
|  | Example 1 | C1 | C2 | C3 | C4 |
| Drying Time in hours (Average) |  |  |  |  |  |
| Fruit Rolls | (6.5 hours) | 8–12 hours | 4–8 hours | 8–15 hours | 24–36 hours |
| (Average) |  | (10 hours) | (6 hours) | (11.5 hours) | (30 hours) |
| Jerky | (7.0 hours) | 4–15 hours | 4–15 hours | 8–15 hours | 24–48 hours |
| (Average) |  | (9.5 hours) | (9.5 hours) | (11.5 hours) | (36 hours) |
| Apples | (6.5 hours) | 8–12 hours | 4–8 hours | 4–15 hours | 24–48 hours |
| (Average) |  | (10 hours) | (6 hours) | (9.5 hours) | (36 hours) |
| Bananas | (5.9 hours) | 12–16 hours | 6–10 hours | 8–36 hours | 24–36 hours |
| (Average) |  | (14 hours) | (5.5 hours) | (22 hours) | (30 hours) |
| Pineapples | (6.5 hours) | 12–20 hours | 8–12 hours | 8–20 hours | 24–72 hours |
| (Average) |  | (16 hours) | (6 hours) | (14 hours) | (48 hours) |
| Tomatoes | (10.8 hours) | 10–14 hours | 8–12 hours | 6–20 hours | 36–72 hours |
| (Average) |  | (12 hours) | (10 hours) | (13 hours) | (54 hours) |

The performance of C4 is significantly less than Ex. 1 and C1–C3 since C4 does not include a fan and has a heating element with 60–80 watts of power. Additionally, C4 required rotation of the tray to achieve acceptable levels of drying uniformity.

Reference should be made to the wattage of the respective units. The heating element of Ex. 1 is 34.5% less powerful than that of C2. Yet, average drying times for the listed food items are only about 8.0% longer for Ex. 1 than for C2. Similarly, the wattage of Ex. 1 is only 20% more powerful than that of C1. Yet, the dehydrator of Ex. 1 dried the food items significantly faster, as set forth in table 2 below.

TABLE 2

| Food item | Percentage reduction in drying time using Ex. 1 as compared to C1 |
| --- | --- |
| Fruit Rolls | 45% |
| Jerky | 26% |
| Apples | 45% |

TABLE 2-continued

| Food item | Percentage reduction in drying time using Ex. 1 as compared to C1 |
|---|---|
| Bananas | 58% |
| Pineapples | 59% |
| Tomatoes | 10% |

It is believed that the recessed nature of the detachable heater blower assembly and the short flow path of heated air across the food trays permits usage of a lower wattage heating element while providing comparable performance to prior art dehydrators having higher wattage heating elements.

Patents and patent applications disclosed herein are hereby incorporated by reference. Other embodiments of the invention are possible. It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A food dehydrator, comprising:
   a dehydrator module including an enclosure containing a plurality of generally horizontal support surfaces, and an opening extending generally vertically through the support surfaces;
   a releasably attachable cover provided on a top surface of the dehydrator module; and
   a heater blower assembly including a motor driven fan and a heating element, the fan operable to direct pressurized, heated air radially inward and generally horizontally across the support surfaces.

2. The dehydrator according to claim 1, wherein the heater blower assembly is releasably attached to the cover.

3. The dehydrator according to claim 1, wherein the fan is composed of a hub and a plurality of blades mounted in a housing, and the motor is positioned within the hub of the blower.

4. The dehydrator according to claim 1, wherein the fan is a centrifugal fan.

5. The dehydrator according to claim 1, wherein the motor is a brushless motor.

6. The dehydrator according to claim 1, wherein the heating element comprises a flat, ring-shaped assembly of a plurality of interconnected, rectangular insulation plates, and a segment of coiled heating wire not having fiberglass yarn reinforcement mounted on each plate.

7. The dehydrator according to claim 1, further comprising a thermostat positioned in the cover, wherein air circulating through the dehydrator passes thereby.

8. The dehydrator according to claim 1, wherein the opening of the dehydrator module provides a central opening extending generally vertically through the support surfaces in fluid communication with the heater blower assembly for directing heated air radially inward across the plurality of support surfaces.

9. The dehydrator according to claim 1, wherein the dehydrator module comprises a base with an outlet vent for exhausting the heated air.

10. The dehydrator according to claim 1, wherein the cover includes an inlet vent for passage of air therethrough.

11. The dehydrator according to claim 1, wherein the dehydrator module includes air ducts on an outer perimeter surface in fluid communication with the heater blower assembly for directing heated air radially inward and generally horizontally across the plurality of support surfaces.

12. The dehydrator according to claim 1, wherein the cover includes an air duct on an outer perimeter surface in fluid communication with the heater blower assembly and the air ducts of the dehydrator module.

13. The dehydrator according to claim 1, having a plurality of blower ports around the outer perimeter of the support surfaces to direct heated air radially inward across the support surfaces.

14. The dehydrator according to claim 1, wherein the opening of the dehydrator module provides a central opening extending generally vertically through the support surfaces in fluid communication with a space provided between each of the support surfaces for exhausting heated air into the central opening.

15. A food dehydrator, comprising:
   a dehydrator module comprising a base and a side wall forming an enclosure containing a plurality of support surfaces, the base having an outlet vent, the support surfaces having central openings defining a central cavity;
   a top mountable cover having an air inlet vent; and
   a heater blower assembly disposed in the cover, and including a motor driven fan and a heating element;
   where, in operation, air is drawn in through the air inlet vent, through the fan and to the heating element, and pressurized, heated air is directed radially inward and generally horizontally across the support surfaces.

16. The dehydrator according to claim 15, wherein at least a portion of the heated air is exhausted to the atmosphere through the outlet vent.

17. A food dehydrator, comprising:
   a dehydrator module including a base having an outlet vent; and at least one food tray having a support surface with a central opening, the food tray capable of stacking vertically with the base;
   a cover capable of stacking vertically with the food tray; and
   a heater blower assembly including a motor driven fan and a heating element disposed in the cover, the cover having an air inlet vent through which air can be drawn toward the fan and the heating element;
   wherein the fan is operable to direct pressurized, heated air axially inward across the support surface of the food tray, at least a portion of the heated air being exhausted to the atmosphere through the outlet vent.

18. The dehydrator according to claim 17, wherein the dehydrator module comprises:
   a first blower port for directing heated air radially inward across a floor of the base and across a bottom surface of the support surface; and
   a second blower port for directing heated air radially inward across a top surface of the support surface.

19. A kit for assembling a food dehydrator, comprising:
   a base having an outlet vent;
   a food tray having a support surface with a central opening, and capable of stacking vertically with the base;
   a cover capable of stacking vertically with the food tray, and having an air inlet vent;
   a heater blower assembly including a motor driven fan and heating element removably mountable in the cover;
   wherein the food tray and the cover in an engaged arrangement, form a blower port around the perimeter of the support surface to direct heated air flow radially inward and generally horizontally across the support surface of the food tray.

20. The kit according to claim 19, wherein the food tray includes air ducts on an outer perimeter surface and, in an assembled arrangement, the air ducts of the food tray are in fluid communication with the heater blower assembly.

21. The kit according to claim 19, wherein the cover includes an air duct on an outer perimeter surface and, in an assembled arrangement, the air duct of the cover is in fluid communication with the heater blower assembly and the air ducts of the food tray.

22. A method of operating a food dehydrator, comprising the steps of:

vertically stacking at least one food tray onto a base, the food tray having a support surface with a central opening, and air ducts on an outer perimeter surface; and the base having an outlet vent;

vertically stacking a cover on the food tray, the cover having an air inlet vent and an air duct on an outer perimeter surface, and a heater blower assembly removably mounted therein; the heater blower assembly including a motor driven fan and heating element; wherein, in a stacked arrangement, the outer perimeter air duct of the cover is in fluid communication with the heater blower assembly and the outer perimeter air duct of the food tray;

drawing air in through the air inlet vent of the cover to the heating element; and directing heated air radially outward into the outer perimeter air duct of the cover, into the outer perimeter air duct of the food tray, and radially inward across the support surface of the food tray, and venting at least a portion of the air to the atmosphere through the outlet vent.

23. The method according to claim 22, wherein the motor driven fan is a centrifugal fan.

24. The method according to claim 22, further comprising: using a brushless motor to drive the fan.

25. The method according to claim 22, further comprising: heating the air with a heating element comprising a flat, ring-shaped assembly of a plurality of interconnected, rectangular insulation plates, and a segment of coiled heating wire not having fiberglass yarn reinforcement mounted on each plate.

26. The method according to claim 22, further comprising: measuring the temperature of the air by means of a thermostat positioned within the cover.

* * * * *